(12) United States Patent
Yoshioka et al.

(10) Patent No.: US 9,371,802 B2
(45) Date of Patent: Jun. 21, 2016

(54) EXHAUST GAS RECIRCULATION APPARATUS OF ENGINE WITH SUPERCHARGER

(71) Applicant: AISAN KOGYO KABUSHIKI KAISHA, Obu-shi, Aichi (JP)

(72) Inventors: Mamoru Yoshioka, Nagoya (JP); Takehide Nakamura, Handa (JP)

(73) Assignee: AISAN KOGYO KABUSHIKI KAISHA, Obu-shi (JP)

(*) Notice: Subject to any disclaimer, the term of this patent is extended or adjusted under 35 U.S.C. 154(b) by 127 days.

(21) Appl. No.: 14/340,136

(22) Filed: Jul. 24, 2014

(65) Prior Publication Data
US 2015/0075162 A1 Mar. 19, 2015

(30) Foreign Application Priority Data
Sep. 16, 2013 (JP) ................................. 2013-191237

(51) Int. Cl.
*F02M 25/07* (2006.01)
*F02B 29/04* (2006.01)

(52) U.S. Cl.
CPC ........ *F02M 25/0706* (2013.01); *F02B 29/0468* (2013.01); *F02M 26/06* (2016.02); *F02M 26/50* (2016.02); *Y02T 10/121* (2013.01); *Y02T 10/146* (2013.01)

(58) Field of Classification Search
CPC .......... F02M 25/0701; F02M 25/0707; F02M 25/0718; F02M 25/0726; F02B 29/0468
USPC .......................................................... 60/605.2
See application file for complete search history.

(56) References Cited

U.S. PATENT DOCUMENTS

| | | | | |
|---|---|---|---|---|
| 2007/0044469 | A1* | 3/2007 | Harada | ............. F02M 25/0712 60/599 |
| 2013/0219886 | A1* | 8/2013 | Koch | ................. F02M 25/0732 60/605.2 |
| 2014/0196454 | A1* | 7/2014 | Ulrey | ........................ F01N 3/10 60/605.2 |

FOREIGN PATENT DOCUMENTS

| | | | | |
|---|---|---|---|---|
| JP | A-10-299541 | 11/1998 | | |
| JP | A-2009-293382 | 12/2009 | | |
| JP | A-2010-59921 | 3/2010 | | |
| JP | EP 2221464 A1 * | 8/2010 | ............. | F02D 21/08 |
| JP | A-2012-229679 | 11/2012 | | |

* cited by examiner

*Primary Examiner* — Audrey K Bradley
(74) *Attorney, Agent, or Firm* — Oliff PLC

(57) ABSTRACT

In an engine provided with a supercharger and a low pressure loop EGR apparatus, an ECU controls an EGR valve to fully close when a detected operating condition is a predetermined operating condition. An outlet of an EGR passage is located at a higher position than an inlet in a vertical direction to allow condensed water to flow downward from downstream to upstream of the EGR valve and flow downward through the EGR passage to an exhaust passage. When the EGR valve has to be controlled to fully close, the ECU forcibly opens the EGR valve when a predetermined discharge condition is established to discharge the condensed water from a downstream side of the EGR valve.

15 Claims, 16 Drawing Sheets

EXHAUST GAS RECIRCULATION APPARATUS OF ENGINE WITH SUPERCHARGER

CROSS-REFERENCE TO RELATED APPLICATIONS

This application is based upon and claims the benefit of priority from the prior Japanese Patent Application No. 2013-191237 filed on Sep. 16, 2013, the entire contents of which are incorporated herein by reference.

BACKGROUND OF THE INVENTION

1. Field of the Invention

The present invention relates to an exhaust gas recirculation apparatus of an engine with a supercharger to allow part of exhaust gas discharged from the supercharger-equipped engine to an exhaust passage to flow as exhaust recirculation gas in an intake passage to return to the engine.

2. Related Art

Conventionally, an exhaust gas recirculation (EGR) apparatus of an engine for a car is arranged to allow part of exhaust gas discharged after combustion from a combustion chamber of the engine to an exhaust passage to flow as EGR gas into an intake passage via an EGR passage, so that the exhaust gas is mixed with intake air flowing in the intake passage and returns to the combustion chamber. The EGR gas flowing in the EGR passage is regulated by an EGR valve provided in the EGR passage. This EGR can reduce mainly nitrogen oxide (NOx) in the exhaust gas and improve fuel consumption during a partial load operation of the engine.

Exhaust gas from the engine contains no oxygen or is in an oxygen lean state. Thus, when part of the exhaust gas is mixed with the intake air by EGR, the oxygen concentration of the intake air decreases. In a combustion chamber, therefore, fuel burns in a low oxygen concentration. Thus, a peak temperature during combustion decreases, thereby suppressing the occurrence of NOx. In a gasoline engine, even when the content of oxygen in intake air is not increased by EGR and a throttle valve is closed to some degree, it is possible to reduce pumping loss of the engine.

Herein, recently, it is conceivable to perform EGR in the entire operating region of the engine in order to further improve fuel consumption. Realization of high EGR rates is thus demanded. To realize the high EGR rates, it is necessary for conventional arts to increase the internal diameter of an EGR passage or increase the opening area of a flow passage provided by a valve element and a valve seat of an EGR valve.

Meanwhile, it is also known to provide the EGR apparatus to an engine equipped with a supercharger. Japanese patent application publication No. JP-A-2012-229679 discloses a low pressure loop EGR apparatus to be mounted in a supercharger-equipped engine of this type. This supercharger includes a turbine placed in an exhaust passage and a compressor placed in an intake passage and driven by the turbine. This EGR apparatus includes an EGR passage provided between the exhaust passage downstream of the turbine and the intake passage upstream of the compressor, and an EGR valve provided in the EGR passage. To prevent corrosion due to condensed water generated in the EGR passage while addressing a demand for strict NOx reduction, this EGR apparatus is configured to close the EGR valve as needed to thereby limit a recirculation amount of EGR gas.

SUMMARY OF INVENTION

Problems to be Solved by the Invention

In the EGR apparatus disclosed in JP-A-2012-229679, when the EGR valve is fully closed, EGR gas may stay in the EGR passage upstream of the EGR valve. At that time, in the EGR valve, a fine or minute gap sometimes occurs between a valve seat and a valve element. It is thus difficult to completely prevent leakage of EGR gas from an upstream side to a downstream side of the EGR valve. Further, foreign matters or substances such as deposits may lodge between the valve seat and the valve element during fully closing of the EGR valve. In such a case, EGR gas may leak from upstream to downstream of the EGR valve. The EGR gas leaking to the downstream side of the EGR valve enters from the EGR passage into the intake passage. If it is cooled under a low temperature condition such as after engine stop, condensed water may be generated from water or moisture in the EGR gas. When a large amount of condensed water accumulates in the EGR passage or the intake passage, the EGR passage or the intake passage may corrode or the large amount of the accumulated condensed water may flow at once into the combustion chamber of the engine. This may cause water hammer or other defects.

In some of the low pressure loop EGR apparatus, a fresh-air induction passage is provided to induce fresh air into an intake passage downstream of a throttle valve. In this fresh-air induction passage, a fresh-air induction valve is provided to regulate a flow rate of fresh air allowed to flow in the fresh-air induction passage. This fresh-air induction valve may leak EGR gas from a downstream side to an upstream side of the valve during fully closing. For instance, when the EGR valve is opened during supercharging for which a supercharger is activated, EGR gas is pushed together with intake air into the combustion chamber through the intake passage. Even when the fresh-air induction valve is in a fully closed state at that time, EGR gas may leak from downstream to upstream of the fresh-air induction valve through a fine or minute gap formed between the valve seat and the valve element. When the EGR gas thus leaking to the upstream side of the fresh-air induction valve is cooled under a low temperature condition, condensed water may be generated. In case the condensed water accumulates in large amounts in the fresh-air induction passage, the fresh-air induction passage may corrode or the large amount of the accumulated condensed water flows at once into the combustion chamber during opening of the fresh-air induction valve. This may cause water hammer or other defects.

The present invention has been made in view of the circumstances and has a purpose to provide an exhaust gas recirculation apparatus of an engine with a supercharger, capable of preventing a large amount of condensed water having been produced from EGR gas leaked to a downstream side of an EGR valve during fully closing of the EGR valve from accumulating on the downstream side. Another purpose of the invention is, in addition to the above purpose, to provide an exhaust gas recirculation apparatus of an engine with a supercharger, cable of preventing a large amount of condensed water having been generated from EGR gas leaked to an upstream side of a fresh-air induction valve during fully closing of the fresh-air induction valve from accumulating on the upstream side.

Means of Solving the Problems

To achieve the above purpose, one aspect of the invention provides an exhaust gas recirculation apparatus of an engine with a supercharger, the engine including: the supercharger provided between an intake passage and an exhaust passage of the engine and configured to increase intake pressure in the intake passage, the supercharger including a compressor placed in the intake passage, a turbine placed in the exhaust passage, a rotary shaft connecting the compressor and the turbine so that the compressor and the turbine are integrally rotatable; an exhaust recirculation passage configured to flow part of exhaust gas discharged from a combustion chamber of the engine to the exhaust passage to flow as exhaust recirculation gas to the intake passage to return to the combustion chamber; an exhaust recirculation valve configured to regulate a flow of the exhaust recirculation gas in the exhaust recirculation passage, the exhaust recirculation passage having an inlet connected to the exhaust passage downstream of the turbine and an outlet connected to the intake passage upstream of the compressor; an operating condition detection unit configured to detect an operating condition of the engine; and a control unit configured to control at least the exhaust recirculation valve based on the detected operating condition, the control unit being arranged to control the exhaust recirculation valve to fully close when the detected operating condition is a predetermined operating condition, wherein the outlet of the exhaust recirculation passage is located at a higher position than the inlet in a vertical direction to allow condensed water to flow downward from a downstream side to an upstream side of the exhaust recirculation valve and to allow the condensed water to flow downward through the exhaust recirculation passage to the exhaust passage, and when the exhaust recirculation valve has to be controlled to fully close, the control unit subjects the exhaust recirculation valve to forced opening control when predetermined discharge conditions are established to discharge the condensed water from the downstream side of the exhaust recirculation valve.

Advantageous Effects of Invention

According to the present invention, it is possible to prevent a large amount of condensed water generated from exhaust recirculation gas leaked to a downstream side of an exhaust recirculation valve during fully closing thereof from accumulating on a downstream side of the exhaust recirculation valve. Consequently, it is possible to prevent corrosion of an exhaust recirculation passage and an intake passage due to the large amount of condensed water, thereby preventing the large amount of condensed water from flowing in a combustion chamber of an engine.

DESCRIPTION OF EMBODIMENTS

First Embodiment

A detailed description of a first embodiment of an exhaust gas recirculation apparatus of an engine with a supercharger embodying the present invention will now be given referring to the accompanying drawings.

Figure 1:
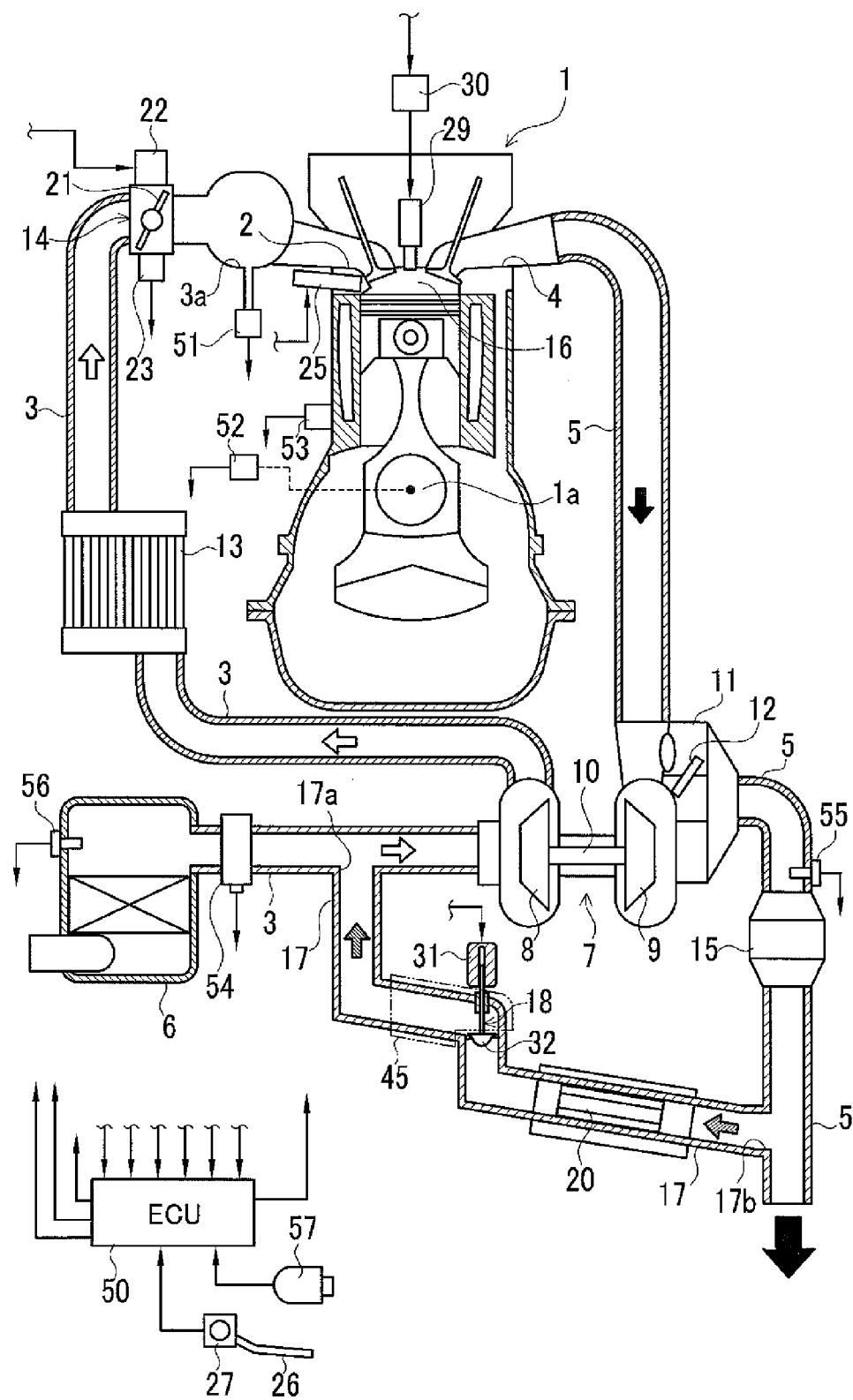
FIG. 1 is a schematic configuration view showing a gasoline engine system including an EGR apparatus of an engine with a supercharger in a first embodiment.

FIG. 1 is a schematic configuration view showing an engine system including an exhaust gas recirculation (EGR) apparatus of a supercharger-equipped engine in the present embodiment. This engine system includes a reciprocating-type engine 1. This engine 1 has an intake port 2 connected to an intake passage 3 and an exhaust port 4 connected to an exhaust passage 5. An air cleaner 6 is provided at an inlet of the intake passage 3. In the intake passage 3 downstream of the air cleaner 6, a supercharger 7 is placed in a position between a portion of the intake passage 3 and a portion of the exhaust passage 5 to increase the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotatable. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, carry out supercharging.

In the exhaust passage 5, adjacent to the supercharger 7, an exhaust bypass passage 11 is provided by detouring around the turbine 9. In this exhaust bypass passage 11, a waste gate valve 12 is placed. This waste gate valve 12 regulates exhaust gas allowed to flow in the exhaust bypass passage 11. Thus, a flow rate of exhaust gas to be supplied to the turbine 9 is regulated, thereby controlling the rotary speeds of the turbine 9 and the compressor 8, and adjusting supercharging pressure of the supercharger 7.

In the intake passage 3, an intercooler 13 is provided between the compressor 8 of the supercharger 7 and the engine 1. This intercooler 13 serves to cool intake air having the pressure increased by the compressor 8 and hence a high temperature, down to an appropriate temperature. A surge tank 3a is provided in the intake passage 3 between the intercooler 13 and the engine 1. Further, an electronic throttle device 14 that is an electrically-operated throttle valve is placed downstream of the intercooler 13 but upstream of the surge tank 3a. This throttle device 14 corresponds to one example of an intake regulating valve of the invention. The throttle device 14 includes a butterfly-shaped throttle valve 21 placed in the intake passage 3, a DC motor 22 to drive the throttle valve 21 to open and close, and a throttle sensor 23 to detect an opening degree or position (a throttle opening degree) TA of the throttle valve 21. The throttle device 14 is configured so that the throttle valve 21 is driven by the DC motor 22 to open and close according to operation of an accelerator pedal 26 by a driver to adjust the opening degree of the throttle valve 21. The configuration of this throttle device 14 can be provided by for example a basic configuration of a "throttle device" disclosed in JP-A-2011-252482, FIGS. 1 and 2. In the exhaust passage 5 downstream of the turbine 9, a catalytic converter 15 is provided as an exhaust catalyst to clean exhaust gas.

The engine 1 is further provided with an injector(s) 25 to inject and supply fuel into a combustion chamber(s) 16. The injector 25 corresponds to one example of a fuel supply unit of the invention. The injector 25 is configured to be supplied with the fuel from a fuel tank (not shown). The engine 1 is further provided with an ignition plug 29 in each cylinder. Each of the ignition plugs 29 ignites in response to high voltage output from an igniter 30. An ignition timing of each ignition plug 29 is determined by output timing of the high voltage from the igniter 30. The ignition plugs 29 and the igniter 30 constitute an ignition device.

In the present embodiment, the EGR apparatus to enable high EGR rates is a low pressure loop system and includes an exhaust gas recirculation (EGR) passage 17 allowing part of exhaust gas discharged from the combustion chamber 16 of the engine 1 to the exhaust passage 5 to flow in the intake passage 3 and return to the combustion chamber 16, and an exhaust gas recirculation (EGR) valve 18 placed in the EGR passage 17 to regulate an exhaust gas flow rate in the EGR passage 17. The EGR passage 17 is provided to extend between the exhaust passage 5 downstream of the catalytic converter 15 and the intake passage 3 upstream of the compressor 8. Specifically, an outlet 17a of the EGR passage 17 is connected to the intake passage 3 upstream of the compressor 8 in order to allow a part of exhaust gas flowing in the exhaust passage 5 to flow as EGR gas into the intake passage 3 and return to the combustion chamber 16. An inlet 17b of the EGR passage 17 is connected to the exhaust passage 5 downstream of the catalytic convertor 15.

In the EGR passage 17, an EGR cooler 20 is provided to cool EGR gas flowing in the EGR passage 17. In the present embodiment, the EGR valve 18 is located in the EGR passage 17 downstream of the EGR cooler 20.

Figure 2:
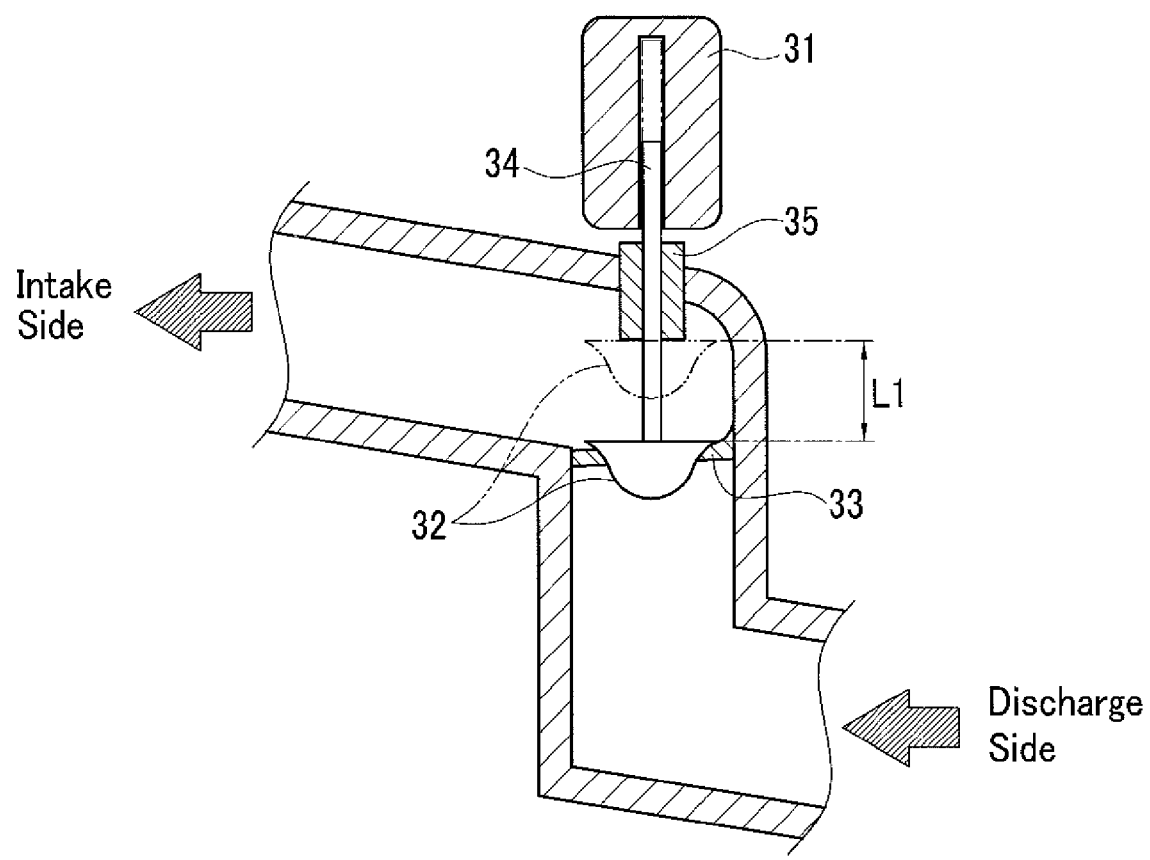
FIG. 2 is an enlarged cross sectional view showing a part of the EGR passage in which an EGR valve is provided in the first embodiment.

FIG. 2 is an enlarged cross sectional view of a part of the EGR passage 17 in which the EGR valve 18 is provided. As shown in FIGS. 1 and 2, the EGR valve 18 is configured as a poppet valve and a motor-operated valve. Specifically, the EGR valve 18 is provided with a valve element 32 to be driven by a DC motor 31. The valve element 32 has an almost conical shape and is configured to seat on a valve seat 33 provided in the EGR passage 17. The DC motor 31 includes an output shaft 34 arranged to reciprocate in a straight line (stroke movement). The valve element 32 is fixed at a leading end of the output shaft 34. This output shaft 34 is supported in a housing defining the EGR passage 17 through a bearing 35. The stroke movement of the output shaft 34 of the DC motor 31 is performed to adjust the opening degree of the valve element 32 with respect to the valve seat 33. The output shaft 34 of the EGR valve 18 is provided to be able to make stroke movement by a predetermined stroke L1 between a fully closed position in which the valve element 32 seats on the valve seat 33 and a fully opened position in which the valve element 32 contacts with the bearing 35. In the present embodiment, an opening area of the valve seat 33 is set larger than a conventional one in order to achieve high EGR rates. Accordingly, the valve element 32 is also designed with large size. As the structure of the above EGR valve 18, for example, a basic structure of an "EGR valve" disclosed in FIG. 1 of JP-A-2010-275941 can be adopted.

In the present embodiment, as shown in FIGS. 1 and 2, the outlet 17a of the EGR passage 17 is positioned at a higher position than the inlet 17b in the vertical direction. The outlet 17a is provided to allow condensed water to flow from a downstream side to an upstream side of the EGR valve 18 and also to allow the condensed water to flow downward through the EGR passage 17 to the exhaust passage 5. To be specific, in the EGR passage 17, the EGR valve 18 is placed vertically to make stroke movement of the valve element 32 and the output shaft 34 in a vertical direction in FIGS. 1 and 2. On an upstream side of the EGR valve 18, the EGR passage 17 includes a section that is located in the immediately vicinity of the EGR valve 18 and extended vertically and a section that is located on a further upstream side and extended downward at a slant toward the exhaust passage 5. In this downward slanting section of the EGR passage 17, the EGR cooler 20 is placed. On the other hand, on a downstream side of the EGR valve 18, the EGR passage 17 includes a section that is located in the immediately vicinity of the EGR valve 18 and extended upward at a slant toward the downstream side and a section that is located on a further downward side and extended vertically toward the intake passage 3. This upward slant section of the EGR passage 17 downstream of the EGR valve 18 acts as a trap 45 to trap the condensed water. Accordingly, when the EGR valve 18 is fully closed, the condensed water generated from moisture contained in the EGR gas leaked from the upstream side to the downstream side of the EGR valve 18 will be trapped in the trap 45. The shape and the place of the valve seat 33 of the EGR valve 18 are set to allow the condensed water collected in the trap 45 to flow from downstream to upstream of the EGR valve 18 when the EGR valve 18 is opened. Thus, a difference in position (height) between the EGR valve 18 and the outlet 17a of the EGR passage 17 serves to prevent the condensed water generated on the downstream side of the EGR valve 18 from flowing in the intake passage 3. Furthermore, a difference in position (height) between the EGR valve 18 and the inlet 17b of the EGR passage 17 serves to allow the condensed water flowing from downstream to upstream of the EGR valve 18 to flow downward through the EGR passage 17 to the exhaust passage 5.

In the present embodiment, for respectively executing fuel injection control, ignition timing control, intake amount control, EGR control, and other controls according to the operating condition of the engine 1, an electronic control unit (ECU) 50 controls the injectors 25, the igniter 30, the DC motor 22 of the electronic throttle device 14, and the DC motor 31 of the EGR valve 18 according to the operating condition of the engine 1. The ECU 50 includes a central processing unit (CPU), various memories that store a predetermined control program and others in advance and that temporarily store computational results and others of the CPU, and an external input circuit and an external output circuit connected to each of them. The ECU 50 is one example of a control unit of the invention. To the external output circuit, there are connected the igniter 30, the injectors 25, the DC motor 22, and the DC motor 31. To the external input circuit, there are connected the throttle sensor 23 and various sensors 27 and 51-57 which correspond to one example of an operating condition detecting unit to detect the operating condition of the engine 1 and transmit various engine signals to the external input circuit.

In the present embodiment, the various sensors include the accelerator sensor 27, the intake pressure sensor 51, the rotation speed sensor 52, the water temperature sensor 53, the air flow meter 54, the air-fuel ratio sensor 55, an intake temperature sensor 56, and an ignition switch 57 as well as the throttle sensor 23. The accelerator sensor 27 detects an accelerator opening degree ACC which is an operation amount of the accelerator pedal 26. The intake pressure sensor 51 detects intake pressure PM in the surge tank 3a. That is, the intake pressure sensor 51 is configured to detect intake pressure PM in the surge tank 3a downstream of the throttle valve 21. The rotation speed sensor 52 detects the rotation angle (crank angle) of the crank shaft 1a of the engine 1 and also detects changes in crank angle as the rotation speed (engine rotation speed) NE of the engine 1. The water temperature sensor 53 detects the cooling water temperature THW of the engine 1. The air flow meter 54 detects a flow amount Ga of intake air flowing in the intake passage 3 directly downstream of the air cleaner 6. The air-fuel ratio sensor 55 is placed in the exhaust passage 5 directly upstream of the catalytic convertor 15 to detect an air-fuel ratio A/F in the exhaust gas. The intake temperature sensor 56 provided in the air cleaner 6 detects the temperature (intake temperature) THA to be taken in the intake passage 3. The ignition switch 57 provided in a driver's seat is operated by a driver to start or stop the engine 1 and outputs an operation signal thereof.

In the present embodiment, the ECU 50 is configured to control the EGR valve 18 in the whole operating region of the engine 1 to control EGR according to the operating condition of the engine 1. On the other hand, the ECU 50 is arranged to normally control the EGR valve 18 to open based on an operating condition detected during acceleration operation or steady operation of the engine 1 and control the EGR valve 18 to close during stop of the engine 1, during idle operation, or during deceleration operation.

In the present embodiment, the ECU 50 is arranged to control the electronic throttle device 14 based on an accelerator opening degree ACC in order to drive the engine 1 in response to requests from a driver. The ECU 50 is further arranged to control the electronic throttle device 14 to open based on the accelerator opening degree ACC during acceleration operation or steady operation of the engine 1 and to control the electronic throttle device 14 to close during stop or deceleration operation of the engine 1. Accordingly, the throttle valve 21 is opened during acceleration operation or steady operation of the engine 1, whereas it is closed during stop or deceleration operation of the engine 1.

Herein, in the low pressure loop EGR apparatus, the EGR gas accumulating in the EGR passage 17 upstream of the EGR valve 18 may leak to the downstream side of the EGR valve 18 even during closing of the EGR valve 18. This may cause a possibility that the leaked EGR gas enters the EGR passage 17 (the sections downstream of the valve 18) and the intake passage 3 and is cooled under a low temperature condition, e.g., after stop of the engine 1, (including non-warming period of the engine 1), generating condensed water. If this condensed water accumulates in large amounts in the EGR passage 17 and the intake passage 3, the EGR passage 17 and the intake passage 3 may corrode or the large amount of accumulated condensed water may flow at once to the combustion chamber 16 of the engine 1, which cause water hammer or other defects. In the present embodiment, the ECU 50 executes the following condensed water discharge control in order to prevent a large amount of the condensed water generated from the EGR gas having leaked to the downstream side of the EGR valve 18 during fully closing of the EGR valve 18 from accumulating downstream of the EGR valve 18.

Figure 3:
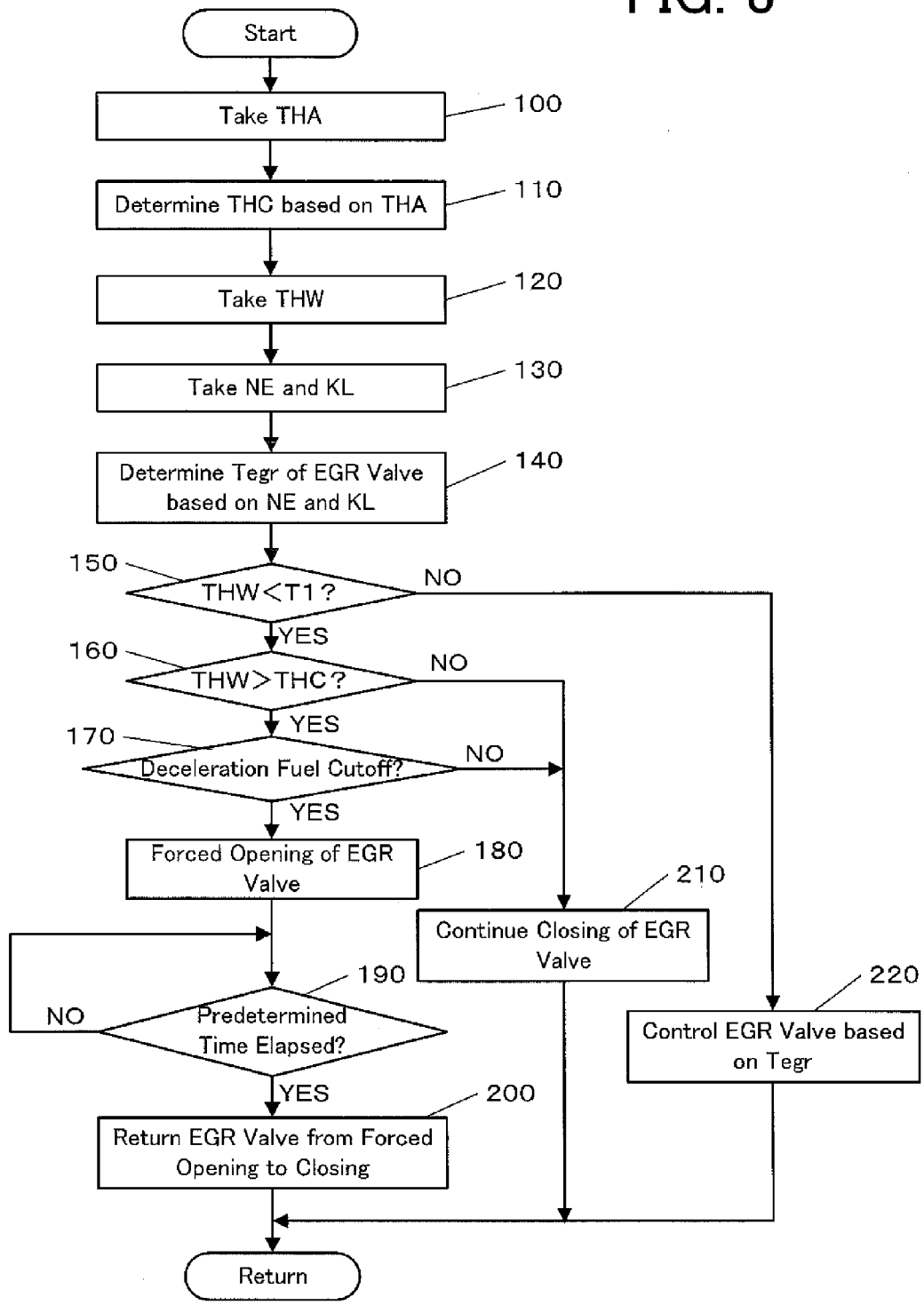
FIG. 3 is a flowchart showing one example of processing details of condensed water discharge control in the first embodiment.

FIG. 3 is a flowchart showing one example of processing details of the condensed water discharge control. When the processing proceeds to this routine, the ECU 50 first takes, or reads, an intake temperature THA based on a detection value of the intake temperature sensor 56 in Step 100.

Figure 4:
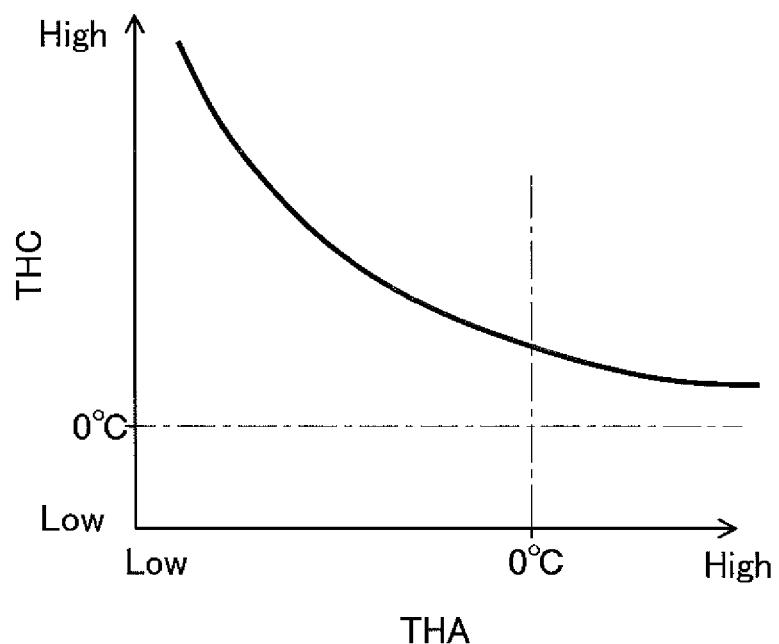
FIG. 4 is a map to be referred to in determining a freezing determination water temperature according to intake temperature in the first embodiment.

In Step 110, the ECU 50 then determines a freezing determination water temperature THC based on the intake temperature THA. The freezing determination water temperature THC is a water temperature used to determine whether or not condensed water is being frozen and serves as a measure to determine freezing of the condensed water in the EGR passage 17. The ECU 50 can obtain the freezing determination water temperature THC according to the intake temperature THA by for example referring to a predetermined map shown in FIG. 4. As shown in FIG. 4, this map is set in a range of the intake temperature THA that is as low as approximately "0° C." so that the freezing determination water temperature THC is lower as the intake temperature THA is higher in this low temperature range.

In Step 120, the ECU 50 takes a cooling water temperature THW based on a detection value of the water temperature sensor 53.

In Step 130, the ECU 50 successively takes an engine rotation speed NE and an engine load KL based on detection values of the intake pressure sensor 51 and the rotation speed sensor 52 respectively. Herein, the ECU 50 can obtain the engine load KL from a relationship between the engine rotation speed NE and intake pressure PM.

In Step 140, the ECU 50 determines a target opening degree Tegr of the EGR valve 18 based on the engine rotation speed NE and the engine load KL. The ECU 50 can obtain this target opening degree Tegr according to the engine rotation speed NE and the engine load KL by referring to a predetermined map (not shown).

In Step 150, the ECU 50 determines whether or not the cooling water temperature THW currently taken is lower than a predetermined value T1. Herein, this predetermined value T1 is a temperature as a measure to indicate that the engine 1 is in a warmed-up state and can be set to for example "70° C.". If a negative determination is made (NO) in Step 150, the ECU 50 shifts the processing to Step 220. If a positive determination is made (YES) in Step 150, the ECU 50 advances the processing to Step 160. In this case, the engine 1 is not warmed up and thus the ECU 50 subjects the EGR valve 18 to closing control, thereby closing the valve 18.

When the ECU 50 judges that the engine 1 is in the warmed-up state, the ECU 50 controls the EGR valve 18 to open based on the target opening degree Tegr in Step 220, and then returns the processing to Step 100.

In Step 160, the ECU 50 determines whether or not the cooling water temperature THW is higher than the freezing determination water temperature THC currently obtained. If NO in Step 160, the ECU 50 shifts the processing to Step 210. If YES in Step 160, the ECU 50 shifts the processing to Step 170.

When the ECU 50 judges that the engine 1 is not in the warmed-up state and the engine 1 is in a temperature state where condensed water is freezable, the ECU 50 continues to close the EGR valve 18 in Step 210 and returns the processing to Step 100.

In Step 170, the ECU 50 determines whether or not the operating condition of the engine 1 is in a deceleration fuel cutoff operation. That is, it is determined whether or not the engine 1 is in a deceleration operation and fuel supply to the engine 1 by the injectors 25 is cut off. This condition is referred to as "deceleration fuel cutoff". If NO in Step 170, the ECU 50 shifts the processing to Step 210. If YES in Step 170, the ECU 50 shifts the processing to Step 180.

In Step 180, in which the engine 1 is not in the warmed-up state, the engine 1 is in the temperature state where condensed water is not freezable, and the engine 1 is in a light load operating condition of the deceleration fuel cutoff, the ECU 50 subjects the EGR valve 18 to the forced opening control. Specifically, the ECU 50 forcibly opens the EGR valve 18 from a closed state. Accordingly, the condensed water trapped in the trap 45 on the downstream side of the EGR valve 18 is allowed to flow to the upstream side of the EGR valve 18, flow downward through the EGR passage 17 to the exhaust passage 5, and discharged out.

In Step 190, the ECU 50 waits for a lapse of a predetermined time and then shifts the processing to Step 200. Herein, the predetermined time can be set to for example "1 to 2 seconds".

In Step 200, the ECU 500 returns the EGR valve 18 from the forced opening control to the closing control, and then the returns the processing to Step 100.

According to the above control, when the EGR valve 18 should be controlled to fully close, if predetermined discharge conditions are established to discharge the condensed water from the downstream side of the EGR valve 18, the ECU 50 subjects the EGR valve 18 to the forced opening control in order to discharge the condensed water from the downstream side of the EGR valve 18. Herein, the predetermined discharge conditions include "before completion of warm-up of the engine 1 (corresponding to before the EGR start condition is established)", "the cooling water temperature THW is higher than the freezing determination water temperature THC" and "during the deceleration fuel cutoff of the engine 1". The ECU 50 returns the EGR valve 18 to the closing control when the predetermined time elapses from the starting of the forced opening control.

According to the exhaust gas recirculation apparatus of an engine with a supercharger in the present embodiment, when the EGR valve 18 has to be controlled to fully close, if the predetermined discharge conditions are established, the ECU 50 forcibly opens the EGR valve 18. Thus, the condensed water generated on the downstream side of the EGR valve 18 is allowed to flow from downstream to upstream of the EGR valve 18 and further flow downward through the EGR passage 17 to the exhaust passage 5, and then is discharged out. Therefore, the condensed water generated from the EGR gas having leaked to the downstream side of the EGR valve 18 during fully closing of the EGR valve 18 can be prevented from accumulating in large amounts on the downstream side of the EGR valve 18. This can prevent the corrosion of the EGR passage 17 and the intake passage 3 due to the large amount of the condensed water, and thus prevent the large amount of condensed water from flowing to the combustion chamber 16 of the engine 1.

In the present embodiment, the predetermined discharge conditions include "before the completion of warm-up of the engine 1 (corresponding to before the EGR start condition is established)", "the cooling water temperature THW is higher than the freezing determination water temperature THC" and "during the deceleration fuel cutoff of the engine 1". Accordingly, the condensed water generated downstream of the EGR valve 18 before the engine 1 is completely warmed up is allowed to flow from downstream to upstream of the EGR valve 18, further flow through the EGR passage 17 to the exhaust passage 5, and is discharge out therefrom. This can discharge the condensed water generated before the completion of warm-up of the engine 1 from the downstream side of the EGR valve 18 to the exhaust passage 5. Further, during the deceleration fuel cutoff, the intake amount Ga is small and the pressure in the EGR passage 17 is low, and EGR is less. Thus, the condensed water generated downstream of the EGR valve 18 is not sucked into the intake passage 3. Accordingly, it is possible to prevent the condensed water from improperly flowing from the EGR passage 17 to the combustion chamber 16. When the cooling water temperature THW is lower than the freezing determination water temperature THC, that is, during a cold period in which the condensed water is frozen and is less likely to flow, the forced opening control of the EGR valve 18 is not executed. Thus, unnecessary forced opening control of the EGR valve 18 can be eliminated.

In the present embodiment, the trap 45 is provided downstream of the EGR valve 18, so that the condensed water generated downstream of the EGR valve 18 is trapped in the trap 45. When the EGR valve 18 is subjected to the forced opening control, the condensed water collected in the trap 45 is allowed to flow downward to the upstream side of the EGR valve 18 and further flow downward along the slant of the EGR passage 17 to the exhaust passage 5, and then is discharged out. Thus, the condensed water generated on the downstream side of the EGR valve 18 is allowed to be naturally discharged to the exhaust passage 5 by gravity.

In the present embodiment, the EGR valve 18 is returned to the closing control after a lapse of a predetermined time from the start of the forced opening control. Thus, subsequent normal control of the EGR valve 18 can be performed without any trouble. This can prevent the EGR gas from being unnecessarily taken in the combustion chamber 16 after the EGR valve 18 is forcibly controlled and also prevent unstable operation of the engine 1 due to the EGR gas.

When the above discharge conditions are established, the electronic throttle device 14 (the throttle valve 21) is closed, the intake pressure in the intake passage 3 upstream of the throttle valve 21 remains unchanged even if the EGR valve 18 is returned from the forced opening control to the closing control. Thus, the intake amount Ga in the intake passage 3 less changes.

Second Embodiment

A second embodiment of the exhaust gas recirculation apparatus of an engine with a supercharger according to the invention will be explained in detail below referring to the accompanying drawings.

In each of the following embodiments, similar or identical parts to those in the first embodiment are given the same reference signs as in the first embodiment. The following explanation will be made with a focus on differences from the first embodiment.

Figure 5:
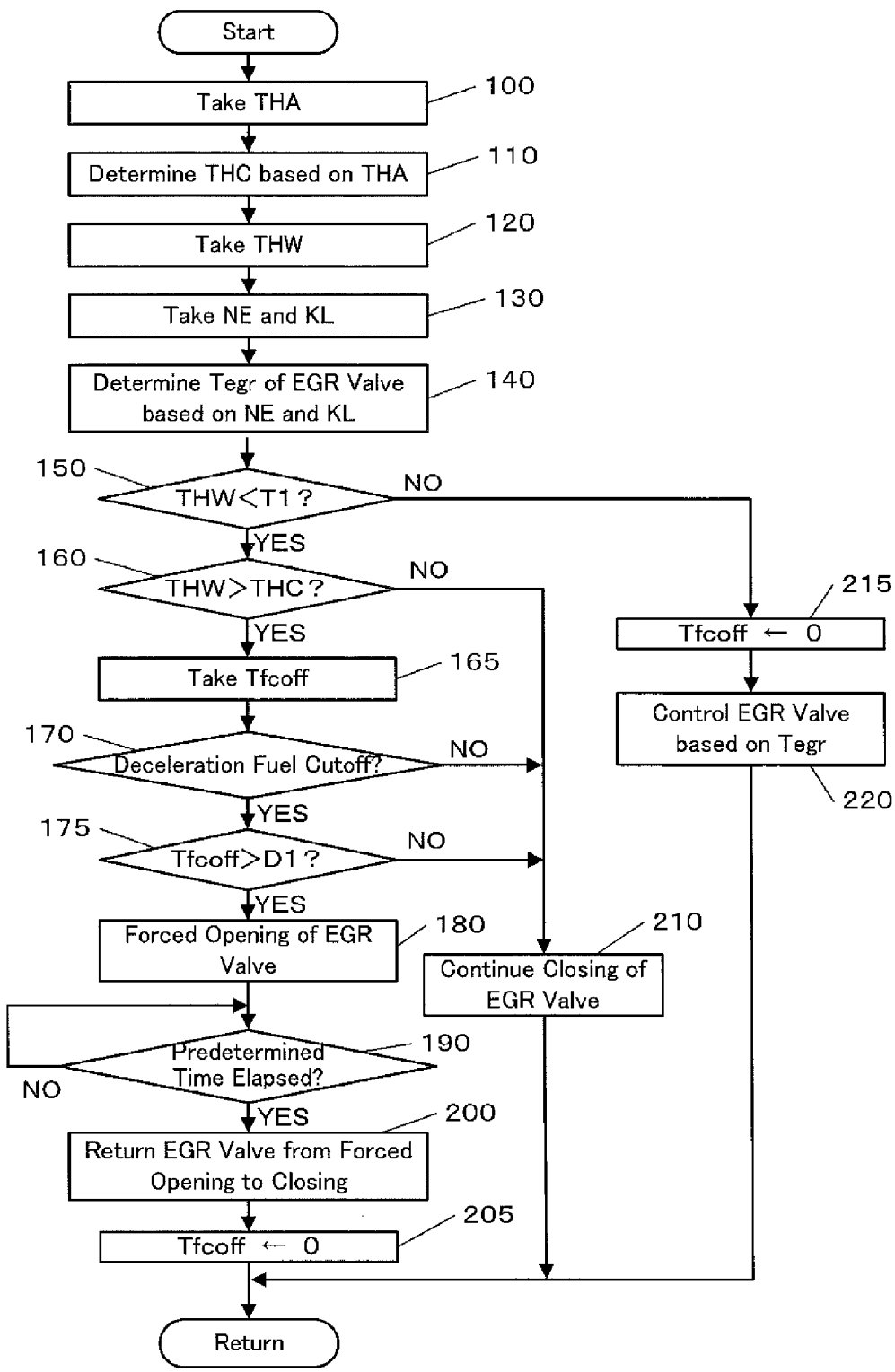
FIG. 5 is a flowchart showing one example of processing details of condensed water discharge control in a second embodiment.

The second embodiment differs in the processing details of condensed water discharge control from the first embodiment. FIG. 5 is a flowchart showing one example of the processing details of the condensed water discharge control in the second embodiment. The flowchart of FIG. 5 differs from the flowchart of FIG. 3 in a processing of Step 165 added between the Steps 160 and 170, a processing of Step 175 added between the Steps 170 and 180, a processing of Step 205 added after Step 200, and a processing 215 added between the Steps 150 and 220 in the flowchart of FIG. 3.

When the processing proceeds to this routine and the processings of Steps 100 to 160 are executed and if YES in Step 160, the ECU 50 takes an "elapsed time without deceleration fuel cutoff" Tfcoff in Step 165. This elapsed time Tfcoff represents an elapsed time for which the deceleration fuel cutoff is not performed after completion of a previous deceleration fuel cutoff operation. The ECU 50 can obtain this elapsed time Tfcoff by counting up an elapsed time from the time when the previous deceleration fuel cutoff is completed during operation of the engine 1.

Thereafter, if YES in Step 170, the ECU 50 determines in Step 175 whether or not the elapsed time Tfcoff is longer than a predetermined value D1. Specifically, the ECU 50 determines whether or not the predetermined time has elapsed from completion of the previous deceleration fuel cutoff. Herein, the predetermined value D1 represents the time period for which a certain amount of the condensed water may be generated on the downstream side of the EGR valve 18 due to the EGR gas having leaked from upstream to downstream of the EGR valve 18 controlled to fully close. If NO in Step 170, the ECU 50 shifts the processing to Step 210. If YES in 170, the ECU 50 shifts the processing to Step 180 and then executes the processings of Steps 180 to 200.

In Step 205 subsequent to Step 200, the ECU 50 resets the elapsed time Tfcoff to "0" and returns the processing to Step 100.

On the other hand, if NO in Step 150, that is, if the engine 1 in the warmed-up state, the ECU 50 resets the elapsed time Tfcoff to "0" in Step 215 and then shifts the processing to Step 220.

According to the above control, different from that in the first embodiment, the predetermined discharge conditions include "before the completion of warm-up of the engine 1 (corresponding to before the EGR start condition is established)", "the cooling water temperature THW is higher than the freezing determination water temperature THC", "during deceleration fuel cutoff of the engine", and "after a lapse of a predetermined time (a predetermined value D1) from the previous deceleration fuel cutoff". Specifically, according to the above control, the EGR valve 18 is subjected to the forced opening control after the predetermined time (the predetermined value D1) is elapsed from the previous deceleration fuel cutoff in addition to the discharge condition in the first embodiment.

The exhaust gas recirculation apparatus of an engine with a supercharger in the present embodiment explained above can provide the following operations and effects in addition to those in the first embodiment. Specifically, since the predetermined discharge conditions include "after a lapse of a predetermined time (a predetermined value D1) from the previous deceleration fuel cutoff", if there is a possibility that a certain amount of condensed occurs on the downstream side of the EGR valve 18, that is, in the trap 45, the condensed water is allowed to flow from downstream to upstream of the EGR valve 18 and further to flow downward through the EGR passage 17 to the exhaust passage 5, and is discharged out. This can reduce the number of times the EGR valve 18 is subjected to the forced opening control to discharge the condensed water from the trap 45 and thus discharge the condensed water to the exhaust passage 5 only when the condensed water substantially accumulates in the trap 45.

Third Embodiment

A third embodiment of the exhaust gas recirculation apparatus of an engine with a supercharger according to the invention will be explained in detail below, referring to the accompanying drawings.

Figure 6:
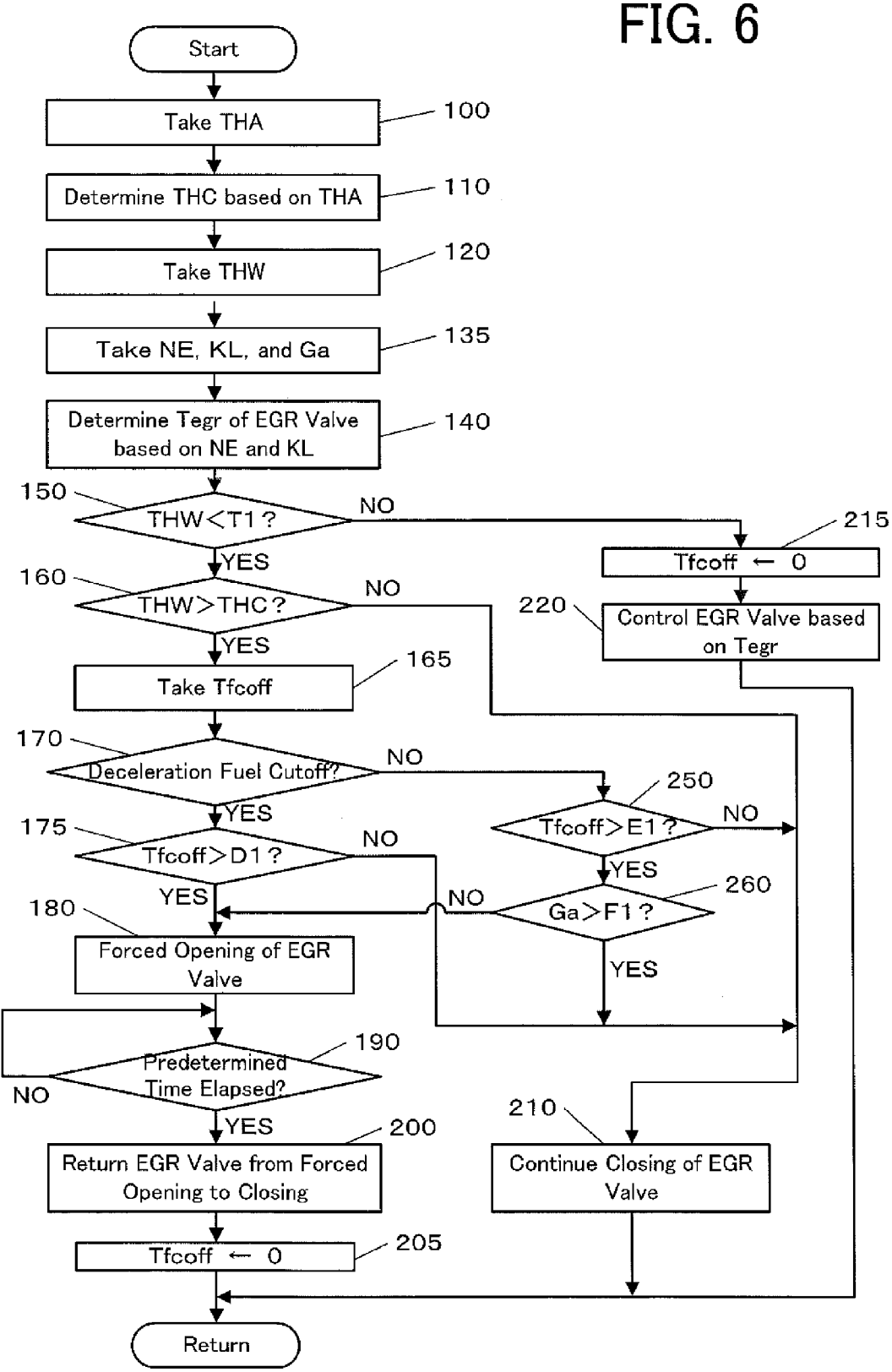
FIG. 6 is a flowchart showing one example of processing details of condensed water discharge control in a third embodiment.

This third embodiment differs in the processing details of condensed water discharge control from the second embodiment. FIG. 6 is a flowchart showing one example of the processing details of the condensed water discharge control in the third embodiment. The flowchart of FIG. 6 differs from the flowchart of FIG. 5 in a processing of Step 135 provided instead of Step 130, and in processings of Steps 250 and 260 added in the flowchart of FIG. 5.

When the processing proceeds to this routine and the processings of Steps 100 to 120 are executed, the ECU 50 takes, in Step 135, the engine rotation speed NE, the engine load KL, and the intake amount Ga based on detection values of the intake sensor 51, the rotation speed sensor 52, and the air flowmeter 54 respectively.

Then, when the processings of Steps 140 to 170 are executed and if NO in Step 170, the ECU 50 determines in Step 250 whether or not the elapsed time Tfcoff is longer than a predetermined value E1. This predetermined value E1 corresponds to a shorter time than the aforementioned predetermined value D1. If NO in Step 250, the ECU 50 shifts the processing to Step 210. If YES in Step 250, the ECU 50 shifts the processing to Step 260.

In Step 260, the ECU 50 determines whether or not the currently taken intake amount Ga is larger than a predetermined value F1. Herein, this predetermined value F1 corresponds to a lower limit of the intake value Ga when the engine 1 is in a light load operation. If NO in Step 260, indicating that the engine 1 is in the light load operation, the ECU 50 shifts the processing to Step 180 and executes the processings of Steps 180 to 205. If YES in Step 260, indicating that the engine 1 is in a middle or high load operation, the ECU 50 shifts the processing to Step 210.

According to the above control, the ECU 50 performs the following control in addition to the control in the second embodiment. Specifically, even if the condition of "during deceleration fuel cutoff" which is one of the predetermined discharge conditions is not established, as long as "after a lapse of the predetermined time (the predetermined value E1 (<D1)) from the previous deceleration fuel cutoff", the ECU 50 subjects the EGR valve 18 to the forced opening control under the condition that the intake amount Ga is not larger than the predetermined value F1, i.e., when the engine 1 is in the predetermined light load operation.

The exhaust gas recirculation apparatus of an engine with a supercharger in the present embodiment explained above can provide the following operations and effects in addition to those in the second embodiment. Specifically, since the EGR valve 18 is forcibly opened under the condition that the engine 1 is in the predetermined light load operation even without establishment of the condition of "during deceleration fuel cutoff" which is one of the predetermined discharge conditions, the frequency of discharging condensed water from the trap 45 located downstream of the EGR valve 18 is increased. Therefore, even if the predetermined discharge condition is not established, it is possible to discharge the condensed water appropriately to the exhaust passage 5 before the condensed water accumulates in large amounts in the trap 45.

Herein, similar to each of the above embodiments, the time when the EGR valve 18 is forcibly opened is preferably "during deceleration fuel cutoff" of the engine 1 for which the EGR gas will not enter the intake passage 3 even when the EGR valve 18 is opened and fresh air is sucked into the intake passage 3. In the second embodiment, when the deceleration fuel cutoff is not performed in the engine 1, the forced opening control of the EGR valve 18 is disabled. During that time the condensed water is not allowed to be discharged from the downstream side of the EGR valve 18 to the exhaust passage 5. In the third embodiment, in contrast, even when the deceleration fuel cutoff is not performed in the engine 1, as long as after a lapse of the predetermined time (the predetermined value E1 (<D1)) from the previous deceleration fuel cutoff, the forced opening control of the EGR valve 18 is enabled under the condition that the engine 1 is in the predetermined light load operation. In a light load operation range of the engine 1, back pressure in the engine 1 is low, the flow rate of EGR gas is small even when the EGR valve 18 is opened, and the flow velocity of the EGR gas is very slow, the EGR gas hardly enters in the intake passage 3. Thus, the condensed water accumulated in the trap 45 located downstream of the EGR valve 18 is allowed to be discharged through the EGR passage 17 to the exhaust passage 5.

Fourth Embodiment

A fourth embodiment of the exhaust gas recirculation apparatus of an engine with a supercharger according to the invention will be explained below in detail, referring to the accompanying drawings.

Figure 7:
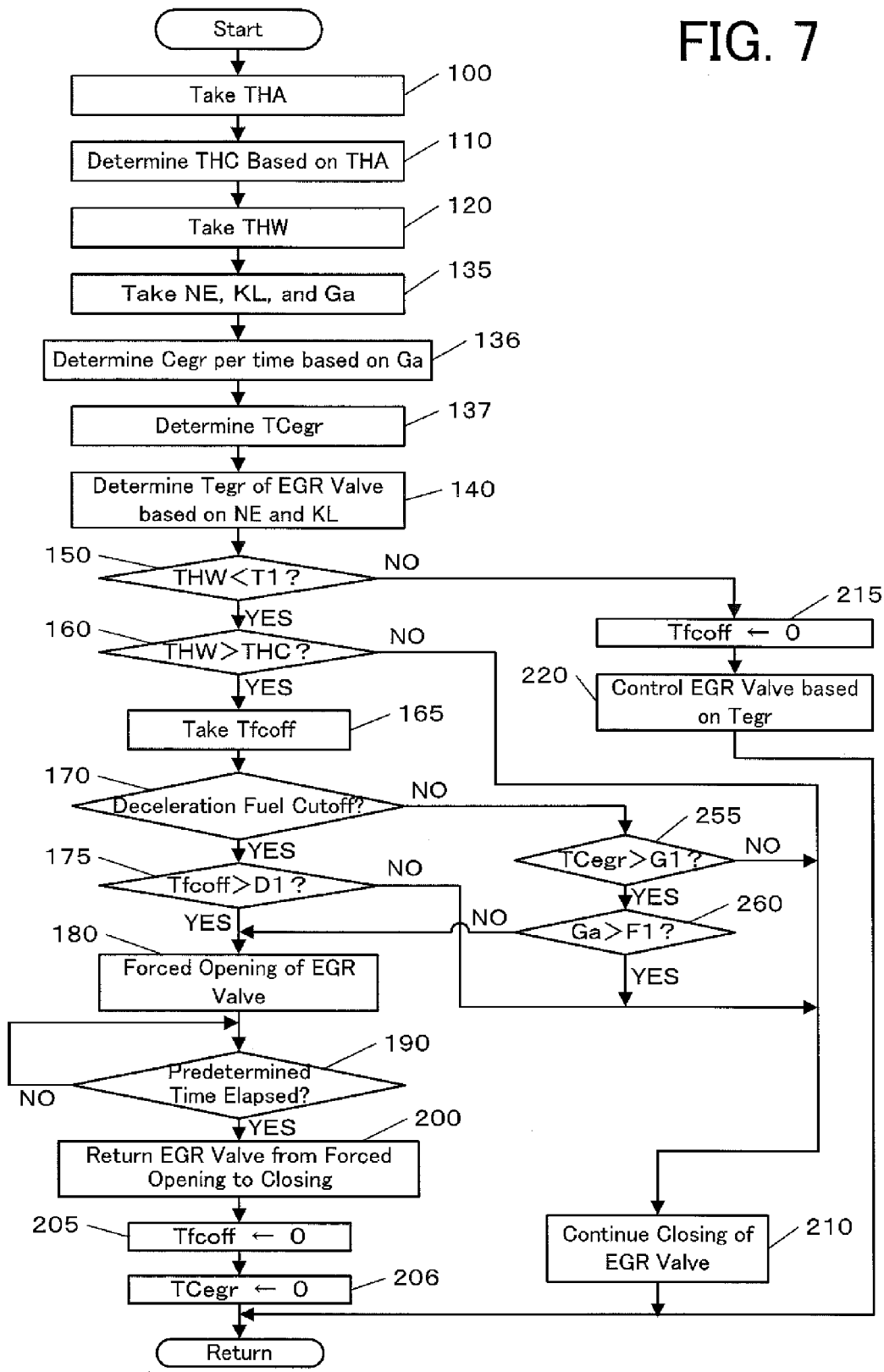
FIG. 7 is a flowchart showing one example of processing details of condensed water discharge control in a fourth embodiment.

This fourth embodiment differs in the processing details of condensed water discharge control from the third embodiment. FIG. 7 is a flowchart showing one example of the processing details of the condensed water discharge control in the fourth embodiment. The flowchart of FIG. 7 differs from the flowchart of FIG. 6 in processings of Steps 136 and 137 added between Steps 135 and 140, a processing of Step 206 added after Step 205, and a processing of Step 255 provided instead of Step 250 in the flowchart of FIG. 6.

Figure 8:
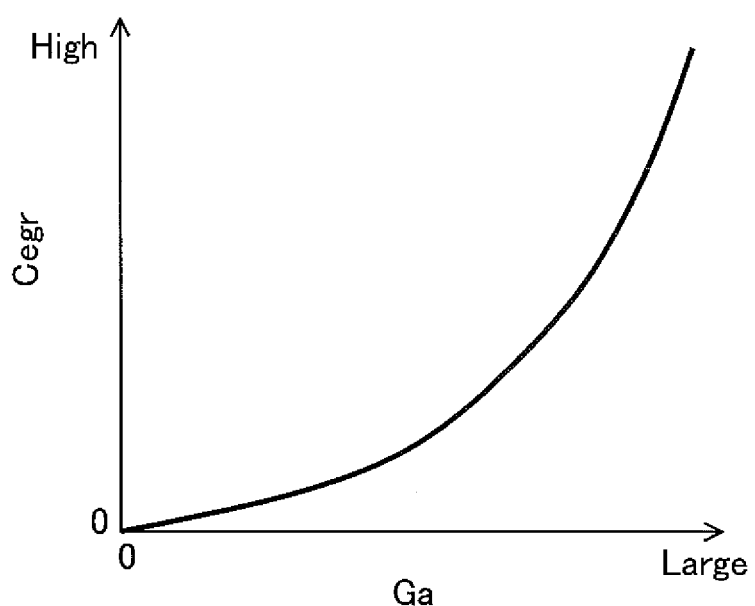
FIG. 8 is a map to be referred to in determining an EGR gas leakage counter value according to an intake amount in the fourth embodiment.

When the processing proceeds to this routine and the processings of Steps 100 to 135 are executed, the ECU 50 determines, in Step 136, an EGR gas leakage counter value Cegr per time based on the currently taken intake amount Ga. This counter value Cegr represents a value to estimate an EGR gas leakage amount per unit of time leaking from the EGR valve 18 in a fully closed state. The ECU 50 can obtain this EGR gas leakage counter value Cegr according to the intake amount Ga for example by referring to a predetermined map shown in FIG. 8. This map is set as shown in FIG. 8 so that the counter value Cegr is larger in a curve as the intake amount Ga is larger. If the EGR valve 18 in the fully closed state leaks gas, the leakage amount of EGR gas leakage to the downstream side of the EGR valve 18 tends to be larger as the back pressure in the engine 1 is higher. Herein, since the back pressure of the engine 1 is nearly proportional to the intake amount Ga, it is possible to estimate the EGR gas leakage amount to the downstream side of the EGR valve 18 by referring to the map of the EGR gas leakage counter value Cegr (EGR gas leakage amount per time) according to the intake amount Ga shown in FIG. 8.

In Step 137, the ECU 50 determines an integrated counter value TCegr of EGR gas leakage. The ECU 50 can obtain this current integrated counter value TCegr by adding a currently determined counter value Cegr to a previous integrated counter value TCegr. This integrated counter value TCegr represents an estimated leakage amount of total EGR gas having leaked from upstream to downstream of the EGR valve 18 from when the EGR valve 18 comes into a fully closed state.

Thereafter, the ECU 50 executes the processings in and subsequent to Step 140 and then resets the integrated counter value TCegr to "0" in Step 206 subsequent to Step 205, and then returns the processing to Step 100.

In Step 255 subsequent to Step 170, the ECU 50 determines whether or not the integrated counter value TCegr is larger than a predetermined value G1. If YES in Step 255, the ECU 50 shifts the processing to Step 260. If NO in Step 255, the ECU 50 shifts the processing to Step 210.

According to the above control, the ECU 50 performs the following control in addition to the control in the third embodiment. Specifically, the ECU 50 calculates the estimated leakage amount (the integrated counter value TCegr) of EGR gas which will leak from upstream to downstream of the EGR valve 18 from when the EGR valve 18 comes into a fully closed state. Even without establishment of the condition of "during deceleration fuel cutoff" which is one of the predetermined discharge conditions, the ECU 50 forcibly opens the EGR valve 18 under the condition that at the time when the estimated leakage amount is larger than the predetermined value G1 and the intake amount Ga is not larger than the predetermined value F1, that is, at the time when the engine 1 is in the light load operation.

The exhaust gas recirculation apparatus of an engine with a supercharger in the present embodiment explained above can provide the following operations and effects in addition to those in the third embodiment. Specifically, even if the condition of "during deceleration fuel cutoff" which is one of the predetermined discharge conditions is not established, the EGR valve 18 is forcibly opened under the condition that at the time when the estimated leakage amount of EGR gas (the integrated counter value TCegr) is larger than the predetermined value G1 and the engine 1 is in the predetermined light load operation. Accordingly, a certain amount of condensed water generated in the trap 45 downstream of the EGR valve 18 is allowed to flow from the trap 45 to the upstream side of the EGR valve 18 and further flow downward through the EGR passage 17 to the exhaust passage 5, and is discharged out. Therefore, even if the predetermined discharge condition is not established, the condensed water is allowed to be discharged through the EGR passage 17 to the exhaust passage 5 before the condensed water accumulates in large amounts in the trap 45.

Fifth Embodiment

A fifth embodiment of the exhaust gas recirculation apparatus of an engine with a supercharger according to the invention will be explained below in detail, referring to the accompanying drawings.

Figure 9:
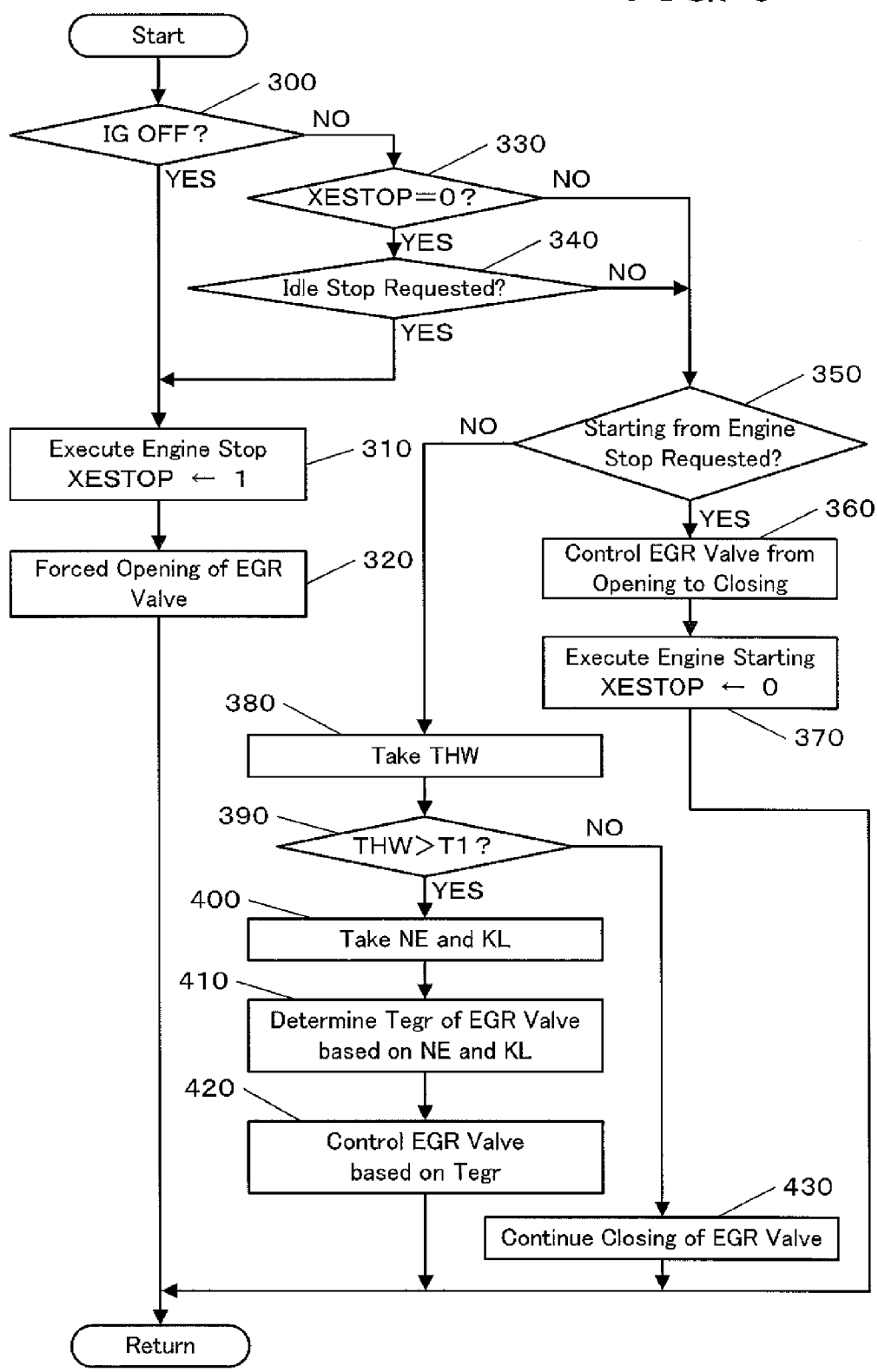
FIG. 9 is a flowchart showing one example of processing details of condensed water discharge control in a fifth embodiment.

This fifth embodiment differs in the processing details of condensed water discharge control from the first embodiment. FIG. 9 is a flowchart showing one example of the processing details of the condensed water discharge control in the fifth embodiment.

When the processing proceeds to this routine, the ECU 50 determines in Step 300 whether or not ignition is off. That is, the ECU 50 judges whether or not the ignition switch 57 is turned off to stop the engine 1. If YES in Step 300, the ECU 50 shifts the processing to Step 310. If NO in Step 300, the ECU 50 shifts the processing to Step 330.

In Step 310 in which the ignition is off, the ECU 50 executes a stop operation of the engine 1. Specifically, the ECU 50 stops fuel injection from the injector(s) 25 and stops an ignition operation of the ignition plug(s) 29. The ECU 50 sets an engine stop flag XESTOP to "1". This flag XESTOP will be reset to "1" when the stop operation of the engine 1 is executed, whereas it is reset to "0" when the starting operation of the engine 1 is executed.

In Step 320, the ECU 50 subjects the EGR valve 18 to the forced opening control and returns the processing to Step 300. Accordingly, the condensed water trapped in the trap 45 downstream of the EGR valve 18 is allowed to flow upstream of the EGR valve 18, further flow downward through the EGR passage 17 to the exhaust passage 5, and is discharged out.

On the other hand, in Step 330, the ECU 50 determines whether or not the engine stop flag XESTOP is "0". Specifically, the ECU 50 judges whether or not starting of the engine 1 has been executed. If YES in Step 330, the ECU 50 shifts the processing to Step 340. If NO in Step 330, the ECU 50 shifts the processing to Step 350.

In Step 340, the ECU 50 determines whether or not idle stop of the engine 1 has been requested. If YES in Step 340, the ECU 50 shifts the processing to Step 310. If NO in Step 340, the ECU 50 shifts the processing to Step 350.

In Step 350 subsequent to Step 330 or 340, the ECU 50 determines whether or not starting of the engine 1 has been requested from the stop state. If YES in Step 350, the ECU 50 shifts the processing to Step 360. If NO in Step 350, the ECU 50 shifts the processing to Step 380.

In Step 360 in which the starting of the engine 1 has been requested, the ECU 50 controls the EGR valve 18 to close from an open state. Specifically, the ECU 50 returns the EGR valve 18 forcibly opened before stop of the engine 1 to a closed state once.

In Step 370, the ECU 50 executes starting of the engine 1. That is, the ECU 50 activates a starter (not shown) and also starts the fuel injection from the injector(s) 25 and the ignition operation of the ignition plug(s) 29. Furthermore, the ECU 50 resets the engine stop flag XESTOP to "0" and then returns the processing to Step 300.

On the other hand, in Step 380, the ECU 50 takes the cooling water temperature THW based on a detection value of the water temperature sensor 53.

In Step 390, the ECU 50 determines whether or not the currently taken cooling water temperature THW is higher than a predetermined value T1. If YES in Step 390, the ECU 50 shifts the processing to Step 400. If NO in Step 390, the ECU 50 shifts the processing to Step 430. In this case where the engine 1 is not in the warmed-up state, the ECU 50 controls the EGR valve 18 to close.

In Step 430, it is indicated that the engine 1 is not in the warmed-up state, the ECU 50 continues the closing control of the EGR valve 18 and returns the processing to Step 300.

In the Step 400, on the other hand, the ECU 50 takes the engine rotation speed NE and the engine load KL based on detection values of the intake pressure sensor 51 and the rotation speed sensor 52 respectively.

In Step 410, the ECU 50 successively determines a target opening degree Tegr of the EGR valve 18 based on the engine rotation speed NE and the engine load KL.

In Step 420, the ECU 50 controls the EGR valve 18 based on the target opening degree Tegr and returns the processing to Step 300.

According to the above control, different from each of the aforementioned controls, the predetermined discharge conditions include "at the time when stop of the engine 1 is executed". The ECU 50 further returns the EGR valve 18 to the closing control when the starting of the engine 1 is requested after the forced opening control of the EGR valve 18.

The exhaust gas recirculation apparatus of an engine with a supercharger in the present embodiment explained above can provide the following operations and effects, different from those in each of the above embodiments. Specifically, in the present embodiment, the EGR valve 18 is subjected to the forced opening control during execution of stop of the engine 1, so that the condensed water generated in the trap 45 downstream of the EGR valve 18 will not be not sucked into the intake passage 3 through the EGR passage 17, but is allowed to from downstream to upstream of the EGR valve 18 and further to flow downward through the EGR passage 17 to the exhaust passage 5, and is discharged out. Accordingly, the condensed water accumulated in the trap 45 during execution of stop of the engine 1 is allowed to be discharged into the exhaust passage 5. Also, the condensed water generated after stop of the engine 1 is allowed to be discharged into the exhaust passage 5. This can prevent the condensed water from becoming sucked from the trap 45 into the combustion chamber 16 through the intake passage 3.

In the present embodiment, the control of the EGR valve 18 is returned to the closing control when the starting of the engine 1 is requested, normal control of the EGR valve 18 after starting of the engine 1 can be performed without any trouble. This can prevent the EGR gas from being unnecessarily sucked into the combustion chamber 16 after starting of the engine 1 and thus prevent unstable operation of the engine 1 due to EGR gas.

Sixth Embodiment

A sixth embodiment of the exhaust gas recirculation apparatus of an engine with a supercharger according to the invention will be explained below in detail, referring to the accompanying drawings.

Figure 10:
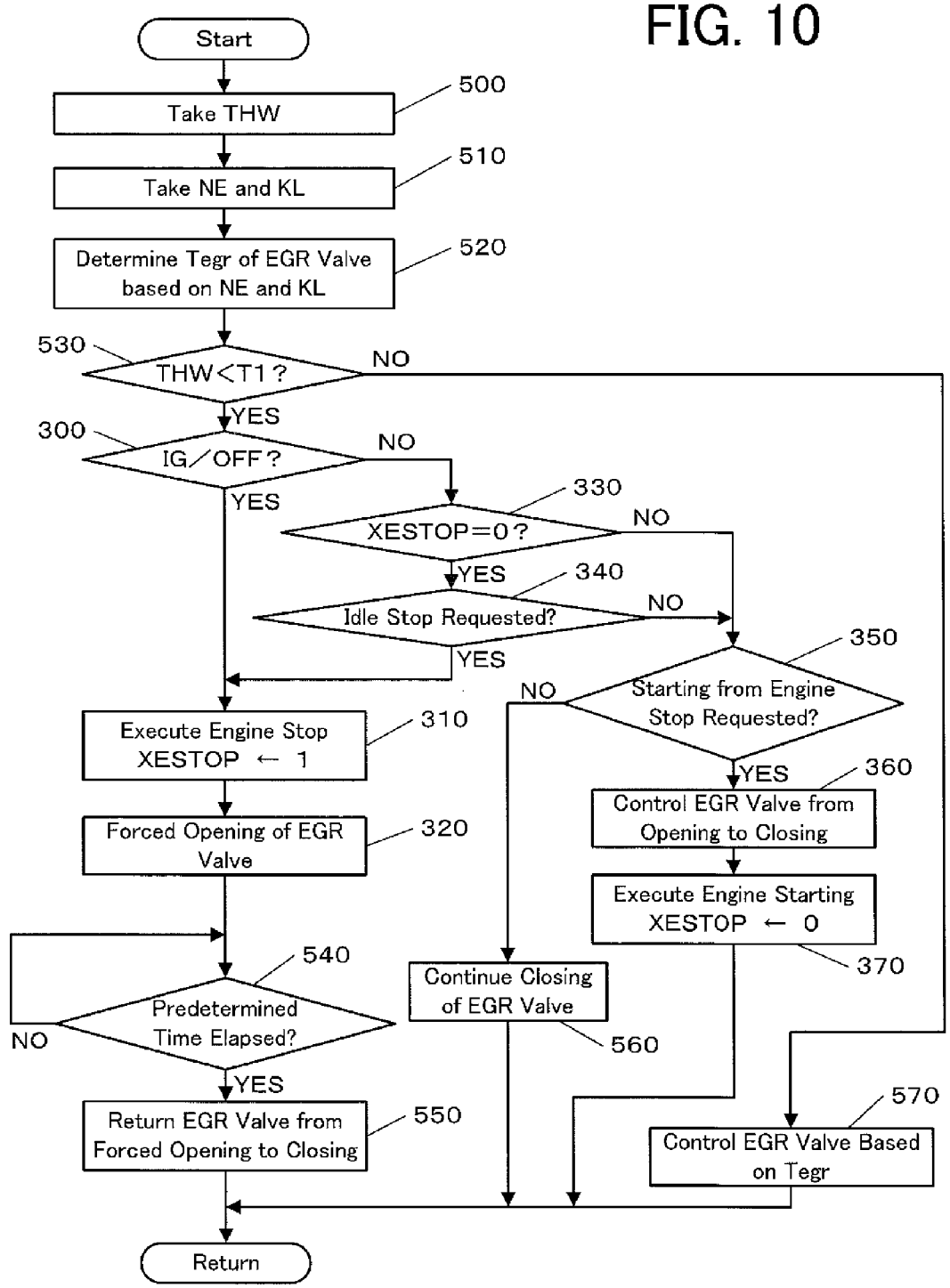
FIG. 10 is a flowchart showing one example of processing details of condensed water discharge control in a sixth embodiment.

This sixth embodiment differs in the processing details of condensed water discharge control from the fifth embodiment. FIG. 10 is a flowchart showing one example of the processing details of the condensed water discharge control in the sixth embodiment. The flowchart of FIG. 10 differs from the flowchart of FIG. 9 in processings of Steps 500 to 570 provided instead of Steps 380 to 430. In the flowchart of FIG. 10, specifically, processings of Steps 500 to 530 are provided before Step 300, and processings of Steps 540 and 550 are provided after Step 320. Furthermore, a processing of Step 560 is provided after Step 350 and a processing of Step 570 is provided after Step 530.

When the processing proceeds to this routine, in Step 500, the ECU 50 takes the cooling water temperature THW based on a detection value of the water temperature sensor 53.

In Step 510, the ECU 50 successively takes the engine rotation speed NE and the engine load KL based on detection values of the intake pressure sensor 51 and the rotation speed sensor 52 respectively.

In Step 520, the ECU 50 determines a target opening degree Tegr of the EGR valve 18 based on the engine rotation speed NE and the engine load KL.

In Step 530, the ECU 50 determines whether or not the currently taken cooling water temperature THW is lower than a predetermined value T1. If NO in Step 530, the ECU 50 shifts the processing to Step 570. If YES in Step 530, the ECU 50 shifts the processing to Step 300 and executes processings of Steps 300 to 370. In this case where the engine 1 is not in the warmed-up state, the ECU 50 controls the EGR valve 18 to close.

In Step 570 in which the engine 1 is in the warmed-up state, the ECU 50 controls the EGR valve 18 to open based on the target opening degree Tegr and then returns the processing to Step 500.

On the other hand, the ECU 50 subjects the EGR valve 18 to the forced opening control in Step 320 and then waits for a lapse of a predetermined time in Step 540 and shifts the processing to Step 550. Herein, the predetermined time can be set to for example "1 to 2 seconds".

In Step 550, the ECU 50 returns the EGR valve 18 from the forced opening control to the closing control and then returns the processing to Step 500.

On the other hand, in Step 350, if the starting of the engine 1 from the stop state has not been requested, the ECU 50 shifts the processing to Step 560 to continue the closing control of the EGR valve 18, and returns the processing to Step 500.

According to the above control, different from that in the fifth embodiment, the predetermined discharge conditions include "before warm-up of the engine 1 (corresponding to before the EGR start condition is established)" and "during execution of stop of the engine 1". The ECU 50 further returns the EGR valve 18 to the closing control when a predetermined time has elapsed from the start of the forced opening control of the EGR valve 18.

Herein, if the engine 1 is not in the warmed-up state, the temperature of the exhaust passage 5 greatly decreases after stop of the engine 1, generating a flow of gas from the intake passage 3 to the exhaust passage 5. Therefore, when the EGR valve 18 is subjected to the forced opening control, remaining EGR gas remaining in the intake passage 3 is discharged into the exhaust passage 5 through the EGR passage 17 and further to the outside. When the decreasing rate of the temperature of the exhaust passage 5 becomes smaller as the time elapses after stop of the engine 1, the remaining EGR gas flowing from the intake passage 3 to the exhaust passage 5 is stopped. At that time, a large amount of exhaust gas (containing water or moisture) discharged from the combustion chamber 16 remains in the exhaust passage 5, thereby weakening the flow of remaining EGR gas from the intake passage 3 to the exhaust passage 5. At the time when this flow disappears, the EGR valve 18 is returned from the forced opening control to the closing control. This can prevent the remaining EGR gas from entering in the intake passage 3.

The exhaust gas recirculation apparatus of an engine with a supercharger in the present embodiment can provide the following operations and effects different from those in the fifth embodiment. In the sixth embodiment, specifically, the predetermined discharge conditions include "before completion of warm-up of the engine 1 (corresponding to before the EGR start condition is established)" and "during execution of stop of the engine 1". At the time when warm-up of the engine 1 is not completed, therefore, the condensed water generated downstream of the EGR valve 18 will not be sucked into the intake passage 3 through the EGR passage 17 during execution of stop of the engine 1, but is allowed to flow from downstream to upstream of the EGR valve 18 and further flow downward through the EGR passage 17 to the exhaust passage 5, and is discharged out. Thus, during execution of stop of the engine 1, the condensed water accumulated in the trap 45 is allowed to be discharged into the exhaust passage 5.

In the present embodiment, during execution of stop of the engine 1, when a predetermined time has elapsed from start of the forced opening control of the EGR valve 18, the EGR valve 18 is returned to the closing control. Thus, normal control of the EGR valve 18 can be performed without any trouble at the time of subsequent engine starting. This can prevent unnecessary flowing of EGR gas in the combustion chamber 16 at the time of subsequent starting of the engine 1 and further prevent unstable operation of the engine 1 due to the EGR gas.

Seventh Embodiment

A seventh embodiment of the exhaust gas recirculation apparatus of an engine with a supercharger according to the invention will be explained below in detail, referring to the accompanying drawings.

Figure 11:
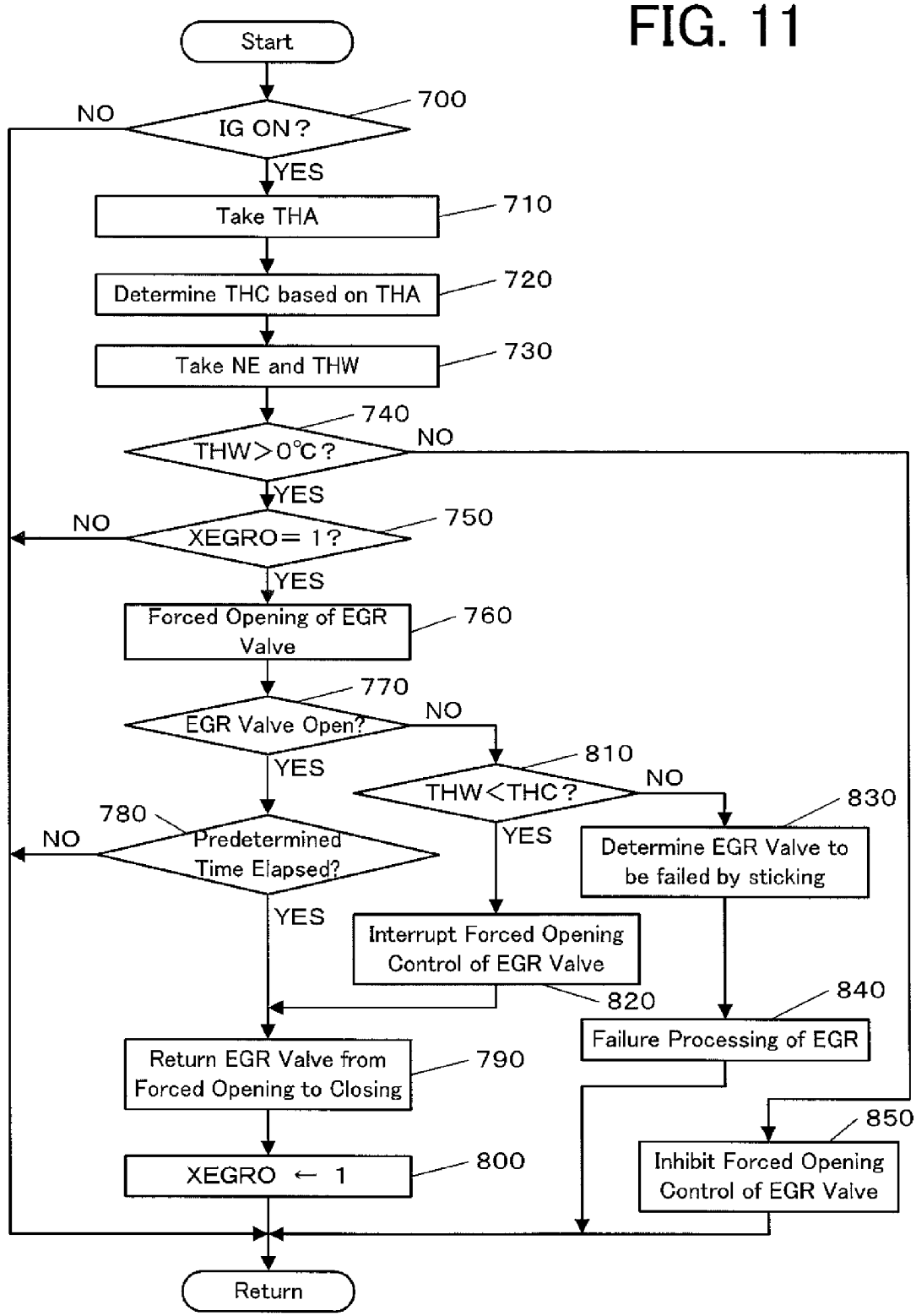
FIG. 11 is a flowchart showing one example of processing details of condensed water discharge control in a seventh embodiment.

This seventh embodiment differs in the processing details from each of the aforementioned embodiments. FIG. 11 is a flowchart showing one example of the processing details of condensed water discharge control in the EGR valve 18 of this embodiment.

When the processing proceeds to this routine, the ECU 50 determines in Step 700 whether or not ignition is on. Specifically, the ECU 50 judges whether or not the ignition switch 57 is turned on to start the engine 1. If YES in Step 700, the ECU 50 shifts the processing to Step 710. If YES in Step 700, the ECU 50 returns the processing to Step 700.

In Step 710, the ECU 50 takes the intake temperature THA based on a detection value of the intake temperature sensor 56.

In Step 720, the ECU 50 then determines a freezing determination water temperature THC based on the intake temperature THA.

In Step 730, the ECU 50 takes the engine rotation speed NE and the cooling water temperature THW based on detection values of the rotation speed sensor 52 and the water temperature sensor 53 respectively.

In Step 740, the ECU 50 determines whether or not the cooling water temperature THW is higher than "0° C.". Specifically, it is determined whether or not the temperature state of the engine 1 is higher than the freezing temperature. If NO in Step 740, the ECU 50 shifts the processing to Step 850. If YES in Step 740, the ECU 50 shifts the processing to Step 750.

In Step 850 in which the temperature state of the engine 1 is in the freezing temperature, the ECU 50 inhibits the forced opening control of the EGR valve 18 and returns the processing to Step 700. Herein, for instance, when the EGR valve 18 is left in the open state during a cold period after stop of the engine 1, the condensed water entering in a gap between the output shaft 34 of the EGR valve 18 and the casing and others may be frozen, causing the valve element 32 to stick in the open state. If the engine 1 is started in this state, there is a risk that the EGR gas accidentally flows in the combustion chamber 16, leading to deterioration in starting performance of the engine 1. To avoid this defect, in Step 850, the forced opening control of the EGR valve 18 is inhibited.

On the other hand, in Step 750, the ECU 50 determines whether or not a valve-closing flag XEGRO is "1". This flag XEGRO will be set to "1" when the EGR valve 18 is controlled to close and set to "0" when the EGR valve 18 is controlled to open. If NO in Step 750, the ECU 50 returns the processing to Step 700. If YES in Step 750, the ECU 50 shifts the processing to Step 760.

In Step 760, the ECU 50 subjects the EGR valve 18 to the forced opening control. That is, the ECU 50 forcibly opens the EGR valve 18 from the closed state at the time of starting of the engine 1.

In Step 770, the ECU 50 determines whether or not the EGR valve 18 is opened. The ECU 50 can make this determination based on a command value to the DC motor 31 of the EGR valve 18. If NO in Step 770, the ECU 50 shifts the processing to Step 810. If YES in Step 770, the ECU 50 shifts the processing to Step 780.

In Step 780, the ECU 50 waits for a lapse of a predetermined time from when the EGR valve 18 is opened, and thereafter shifts the processing to Step 790. Herein the predetermined time can be set to for example "1 second".

In Step 790, the ECU 50 returns the EGR valve 18 from the forced opening control to the closing control. In Step 800, the ECU 50 sets the valve-closing flag XEGRO to "1" and returns the processing to Step 700.

On the other hand, in Step 810, the ECU 50 determines whether or not the cooling water temperature THW is lower than the freezing determination water temperature THC according to the intake temperature THA. If YES in Step 810, the ECU 50 shifts the processing to Step 820. If NO in Step 820, the ECU 50 shifts the processing to Step 830.

In Step 820 in which the cooling water THW is in the temperature state where the condensed water is freezable, and the ECU 50 interrupts the forced opening control of the EGR valve 18 and shifts the processing to Step 790.

In Step 830, the ECU 50 determines that the valve element 32 of the EGR valve 18 is failed by sticking.

Thereafter, in Step 840, the ECU 50 executes an EGR failure processing. Specifically, the ECU 50 executes for example a processing to store the failure determination of the EGR valve 18 in a memory or alert a driver. The ECU 50 then returns the processing to Step 700.

According to the above control, different from those in each of the aforementioned embodiments, the predetermined discharge conditions include "during starting of the engine 1" and "at the time when the condensed water is in a non-freezable temperature state". The ECU 50 returns the EGR valve 18 to the closing control when the predetermined time has elapsed from start of the forced opening control of the EGR valve 18. Herein, while the engine 1 is in the freezing temperature state, the ECU 50 inhibits the forced opening control of the EGR valve 18. Furthermore, the ECU 50 interrupts the forced opening control of the EGR valve 18 while the engine 1 is not in the freezing temperature state and the EGR valve 18 is not open even if it is subjected to the forced opening control and when the cooling water temperature THW is lower than the freezing determination water temperature THC. The ECU 50 determines that the EGR valve 18 is failed by sticking when the EGR valve 18 is not opened even if it is subjected to the forced opening control and when the cooling water temperature THW is higher than the freezing determination water temperature THC.

The exhaust gas recirculation apparatus of an engine with a supercharger in the present embodiment explained above can provide the following operations and effects different from each of the above embodiments. In the present embodiment, specifically, the predetermined discharge conditions include "during starting of the engine 1" and "at the time when the condensed water is in a non-freezable temperature state". The condensed water generated downstream of the EGR valve 18 is not frozen and not sucked into the intake passage 3 through the EGR passage 17, but is allowed to flow downward from the trap 45 to the upstream side of the EGR valve 18 and further flow downward through the EGR passage 17 to the exhaust passage 5, and is discharged out. Therefore, the condensed water accumulated in the trap 45 during starting of the engine 1 is allowed to be discharged into the exhaust passage 5.

In the present embodiment, during starting of the engine 1, the EGR valve 18 is returned to the closing control when the predetermined time has elapsed from start of the forced opening control of the EGR valve 18, so that the normal control of the EGR valve 18 can be performed without any trouble at and subsequent to starting of the engine 1. This can prevent unnecessary flowing of EGR gas in the combustion chamber 16 from starting of the engine 1 and further prevent unstable operation of the engine 1 due to EGR gas.

In the present embodiment, when the engine 1 is in the freezing temperature state, that is, when the condensed water is frozen and does not flow, the forced opening control of the EGR valve 18 is inhibited. Thus, the forced opening control of the EGR valve 18 is not conducted needlessly.

In the present embodiment, furthermore, when the engine 1 is not in the freezing temperature state, the forced opening control of the EGR valve 18 is interrupted when the EGR valve 18 is not opened even if it is subjected to the forced opening control and when the cooling water temperature THW is lower than the freezing determination water temperature THC. Accordingly, when there is a risk that the valve element 32 of the EGR valve 18 may be struck by freezing and the condensed water is frozen and does not flow, the EGR valve 18 is not opened forcibly.

In the present embodiment, furthermore, in the case where the engine 1 is not in the freezing temperature state, when the EGR valve 18 is not opened even if it is subjected to the forced opening control and when the cooling water temperature THW is higher than the freezing determination water temperature THC, the EGR valve 18 is determined to be failed by sticking. Thus, when the valve element 32 of the EGR valve 18 is stuck and immovable and when the condensed water is not frozen, the EGR valve 18 is not forcibly opened and the sticking failure of the EGR valve 18 can be detected.

Eighth Embodiment

An eighth embodiment of the exhaust gas recirculation apparatus of an engine with a supercharger according to the invention will be explained below in detail, referring to the accompanying drawings.

Figure 12:
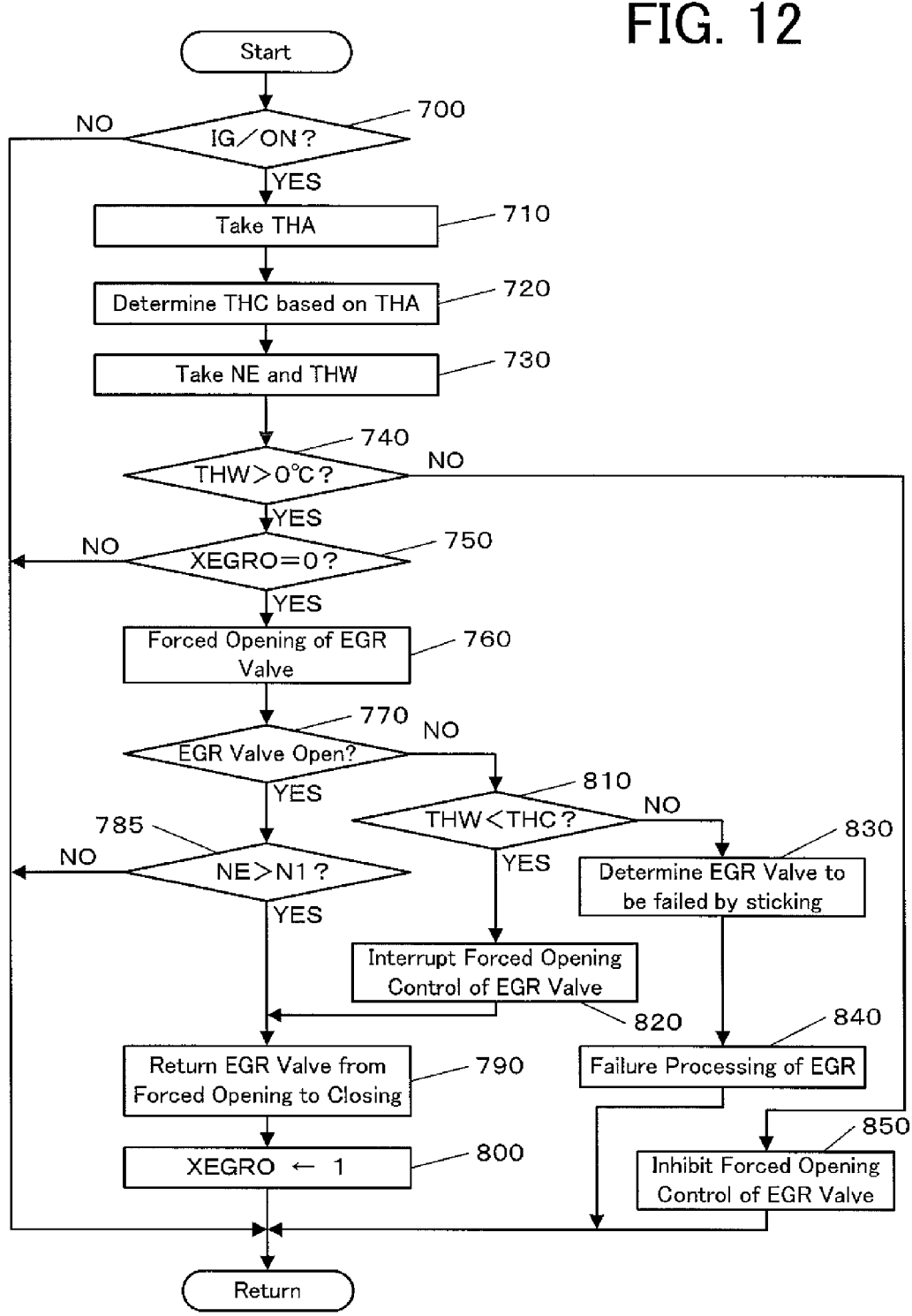
FIG. 12 is a flowchart showing one example of processing details of condensed water discharge control in an eighth embodiment.

This eighth embodiment differs in the processing details of condensed water discharge control from the seventh embodiment. FIG. 12 is a flowchart showing one example of the processing details of the condensed water discharge control. The flowchart of FIG. 12 differs from the flowchart of FIG. 11 in a processing of Step 785 provided instead of Step 780 in the flowchart of FIG. 11.

When the processing proceeds to this routine and the processings of Steps 700 to 770 are executed, if YES in Step 770, the ECU 50 waits until the engine rotation speed NE increases higher than a predetermined value N1 in Step 785 and then shifts the processing to Step 790. Specifically, when starting of the engine 1 is started, the EGR valve 18 is subjected to the forced opening control, and the rotation speed NE of the engine 1 exceeds the predetermined value N1, the ECU 50 returns the EGR valve 18 to the closing control.

Therefore, the present embodiment can provide the following operations and effects different from those in the seventh embodiment. In the present embodiment, specifically, after the forced opening control of the EGR valve 18 is started, when the engine rotation speed NE exceeds the predetermined value N1, the EGR valve 18 is returned to the closing control. The normal control of the EGR valve 18 at or after starting of the engine 1 can be performed without any trouble. This can prevent the EGR gas from being unnecessarily taken in the combustion chamber 16 after starting of the engine 1 and also prevent unstable operation of the engine 1 due to the EGR gas.

Ninth Embodiment

A ninth embodiment of the exhaust gas recirculation apparatus of an engine with a supercharger according to the invention will be explained in detail below, referring to the accompanying drawings.

Figure 13:
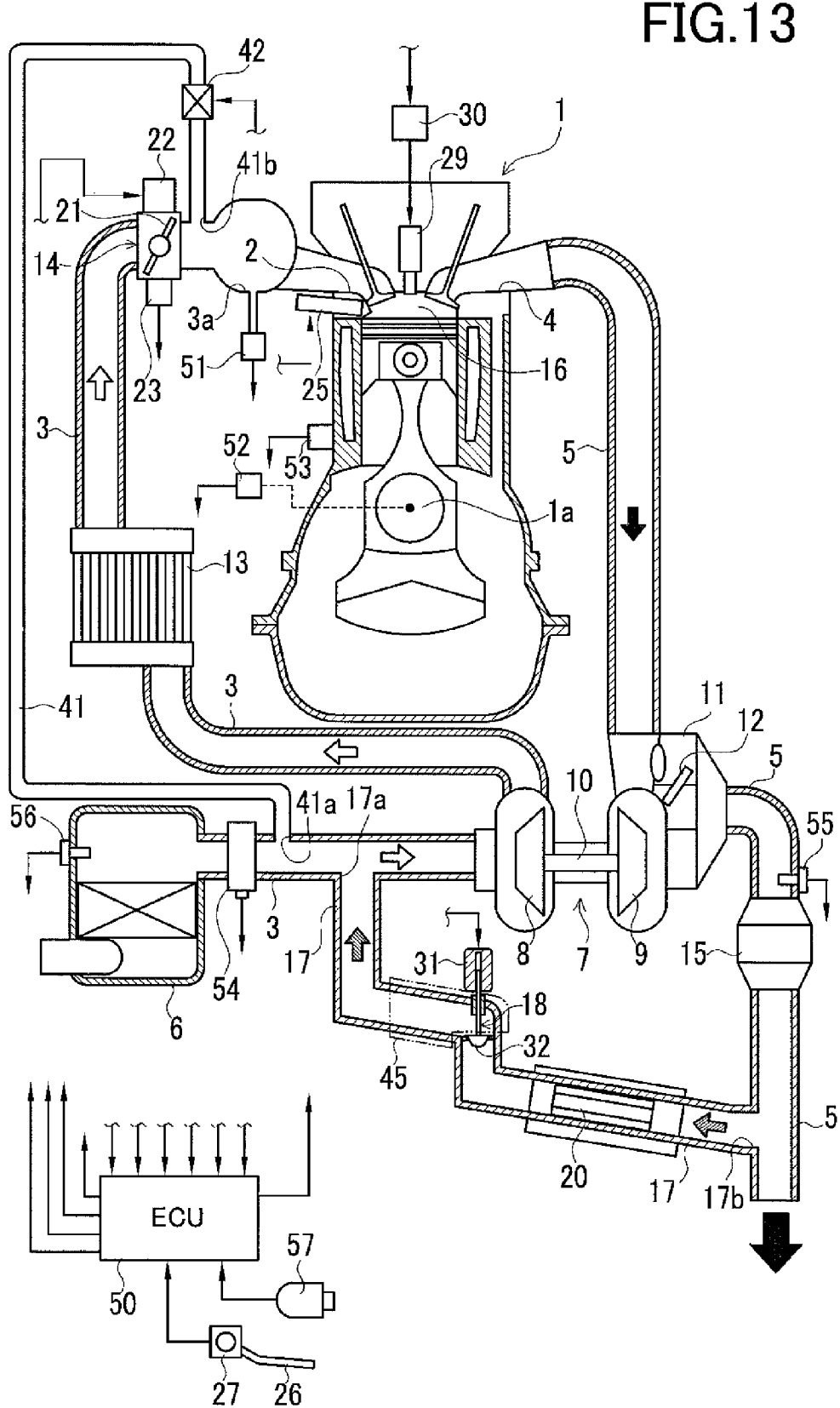
FIG. 13 is a schematic configuration view showing a gasoline engine system including an EGR apparatus of an engine with a supercharger in a ninth embodiment.

This ninth embodiment differs in the engine system and the processing details of condensed water discharge control from each of the aforementioned embodiments. FIG. 13 is a schematic configuration view of a gasoline engine system including an exhaust gas recirculation apparatus of an engine with a supercharger in the present embodiment. As shown in FIG. 13, the present embodiment further includes a fresh-air induction passage 41 to induce fresh air to the intake passage 3 downstream of the throttle valve 21 and a fresh-air induction valve 42 to regulate a flow of fresh air in the fresh-air induction passage 41, which are different from the engine system of FIG. 1. The fresh-air induction passage 41 has an inlet 41a connected to the intake passage 3 upstream of the outlet 17a of the EGR passage 17 and an outlet 41b connected to the intake passage 3 downstream of the throttle valve 21 and upstream of the surge tank 3a. The fresh-air induction valve 42 is a motor-operated valve and is controlled by the ECU 50.

Figure 14:
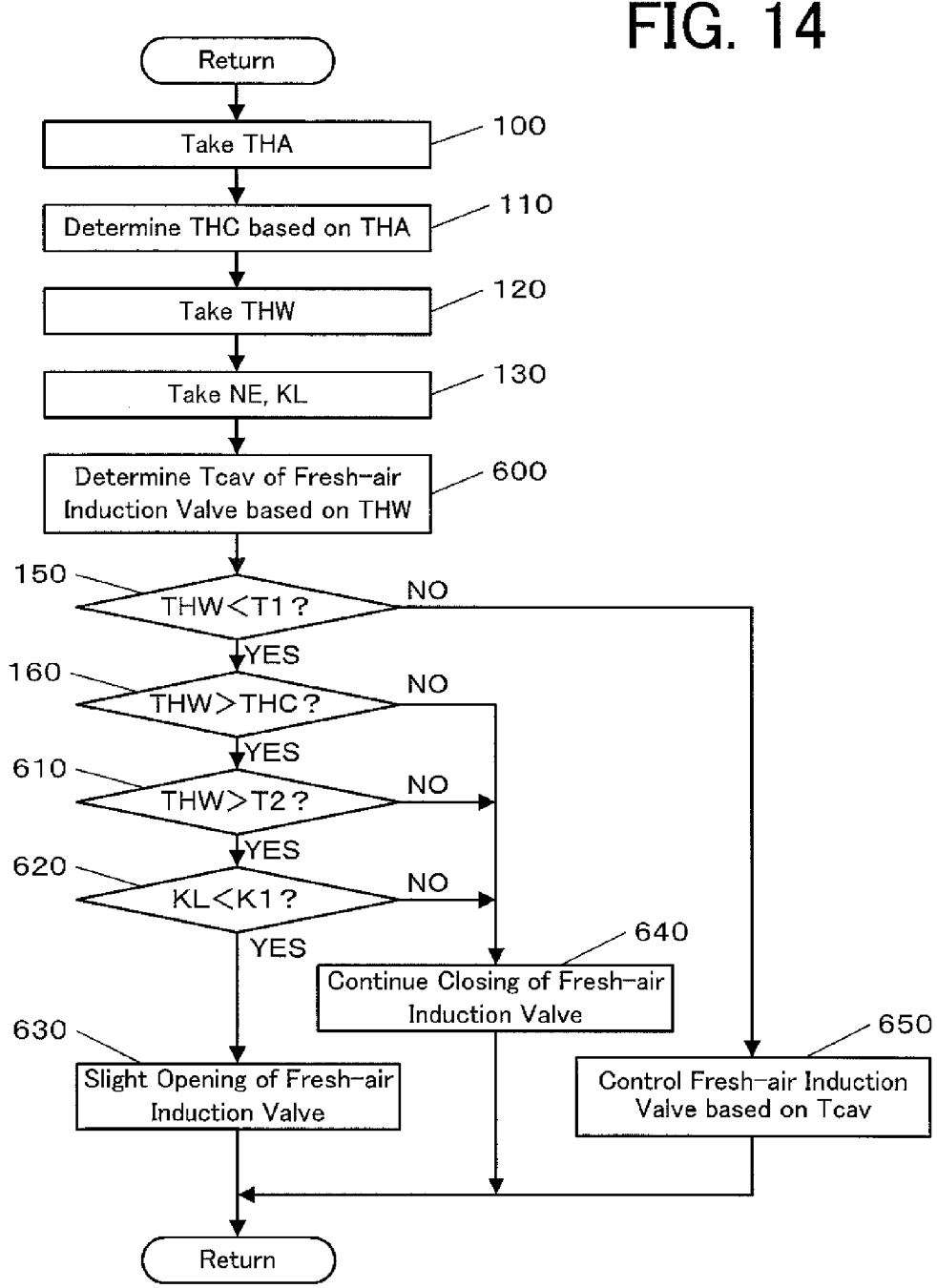
FIG. 14 is a flowchart showing one example of processing details of condensed water discharge control in the ninth embodiment.

In the present embodiment, condensed water discharge control of the fresh-air induction valve 42 is executed in addition to the condensed water discharge control of the EGR valve 18 in the above embodiments. FIG. 14 is a flowchart showing one example of processing details of the condensed water discharge control of the fresh-air induction valve 42 in the present embodiment. The flowchart of FIG. 14 differs from the flowchart of FIG. 3 in a processing of Step 600 provided instead of the Step 140 and processings of Steps 610 to 650 provided instead of Steps 170 to 220 in the flowchart of FIG. 3.

When the processing proceeds to this routine and the processings of Steps 100 to 130 are executed, the ECU 50 determines in Step 600 a target opening degree Tcav of the fresh-air induction valve 42 based on a currently taken cooling water temperature THW. The ECU 50 can obtain this target opening degree Tcav according to the cooling water temperature THW by referring to a predetermined map (not shown).

Thereafter, when the processings of Steps 150 and 160 are performed and if YES in Step 160, the ECU 50 determines in Step 610 whether or not the currently taken cooling water temperature THW is higher than a predetermined value T2 (<T1). Herein, the predetermined value T2 can be set to for example "50° C.". If NO in Step 610, the ECU 50 shifts the processing to Step 640. If YES in Step 610, the ECU 50 shifts the processing to Step 620.

In Step 620, the ECU 50 determines whether or not the currently taken engine load KL is lower than a predetermined value K1. If NO in Step 620, the ECU 50 shifts the processing to Step 640. If YES in Step 620, the ECU 50 shifts the processing to Step 630.

In Step 630, the ECU 50 subjects the fresh-air induction valve 42 to slight opening control. Specifically, the ECU 50 slightly opens the fresh-air induction valve 42 from a closed state. The ECU 50 then returns the processing to Step 100.

On the other hand, in Step 640 subsequent to Step 160, 610, or 620, the ECU 50 continues the closing control of the fresh-air induction valve 42 and returns the processing to Step 100. Herein, if YES in Step 150, that is, if the cooling water temperature THW is lower than a predetermined value T1, indicating that the engine 1 is not in the warmed-up state, the ECU 50 controls the fresh-air induction valve 42 to fully close. In Step 640, therefore, the closing control is continued.

In Step 650 subsequent to Step 150, indicating that the engine 1 is in the warmed-up state, the ECU 50 controls the fresh-air induction valve 42 based on the target opening Tcav and returns the processing to Step 100.

According to the above control, the ECU 50 controls the fresh-air induction valve 42 in the closed state to slightly open under the condition of before completion of warm-up of the engine 1 (corresponding to before the EGR start condition is established) and at the time when the engine 1 is in a light load operation in addition to the controls in the above embodiments.

Herein, if the fresh-air induction valve 42 in the fully closed state leaks gas, EGR gas may leak from downstream to upstream of the fresh-air induction valve 42 under the EGR ON condition where the EGR valve 18 is opened and in a supercharging region in which the supercharger 7 is operated. During stop of the engine 1, EGR gas and others accumulating in the fresh-air induction passage 41 upstream of the fresh-air induction valve 42 are cooled during soaking of the engine 1, possibly generating condensed water in the fresh-air induction passage 41. In the present embodiment, therefore, during stop of the engine 1, the fresh-air induction valve 42 is controlled to fully close to prevent the condensed water generated in the fresh-air induction passage 41 upstream of the fresh-air induction valve 42 from entering the intake passage 3.

When the condensed water leaks from the fresh-air induction passage 41 to the intake passage 3, the condensed water is sucked at once in the engine 1 in sync with low-temperature starting of the engine 1, which may cause misfire. Thus, the condensed water generated in the fresh-air induction passage 41 has to be treated appropriately. In the present embodiment, therefore, under the condition not using the supercharger that the cooling water temperature THW is higher than the predetermined value T2 (e.g., "50° C.") after the low-temperature starting of the engine 1 and is lower than the predetermined value T1 (e.g., "70° C.") at which the engine 1 comes into the warmed-up state, that is, under the condition that the intake pressure PM is a negative pressure, the ECU 50 slightly opens the fresh-air induction valve 42 to allow the condensed water to flow from upstream to downstream of the fresh-air induction valve 42 so that the condensed water in atomized or mist form is gradually sucked again into the combustion chamber 16 of the engine 1. Herein, when the cooling water temperature THW exceeds a little the predetermined value T2, the ECU 50 controls the fresh-air induction valve 42 to slightly open and the air-fuel mixture more poorly burns in the engine 1 as the cooling water temperature THW decreases to very low temperature. Accordingly, the fresh-air induction valve 42 is subjected to the slight opening control under the condition that the cooling water temperature THW is so low as to require starting of EGR. On the other hand, during deceleration operation of the engine 1 from EGR ON, the fresh-air induction valve 42 has to be rapidly opened, and thus the condensed water is treated until then.

The exhaust gas recirculation apparatus of an engine with a supercharger in the present embodiment explained above can provide the following operations and effects in addition to those in the above embodiments. Specifically, the fresh-air induction valve 42 in the closed state is subjected to the slight opening control by the ECU 50 under the condition of "before completion of warm-up of the engine 1 (corresponding to before the EGR start condition is established)" and "at the time when the engine 1 is in a light load operation". Accordingly, the condensed water generated before completion of warm-up on the upstream side of the fresh-air induction valve 42 is discharged in atomized form to the downstream side of the fresh-air induction valve 42 and then is sucked into the combustion chamber 16 through the fresh-air induction passage 41 and the intake passage 3. This makes it possible to prevent the condensed water generated from the EGR gas having leaked from downstream to upstream of the fresh-air induction valve 42 during fully closing of this valve 42 from accumulating in large amounts on the upstream side of the valve 42. Consequently, it is possible to prevent corrosion of the fresh-air induction passage 41 due to a large amount of condensed water and also prevent the large amount of condensed water from flowing in the combustion chamber 16 of the engine 1.

Tenth Embodiment

A tenth embodiment of the exhaust gas recirculation apparatus of an engine with a supercharger according to the invention will be explained in detail below, referring to the accompanying drawings.

Figure 15:
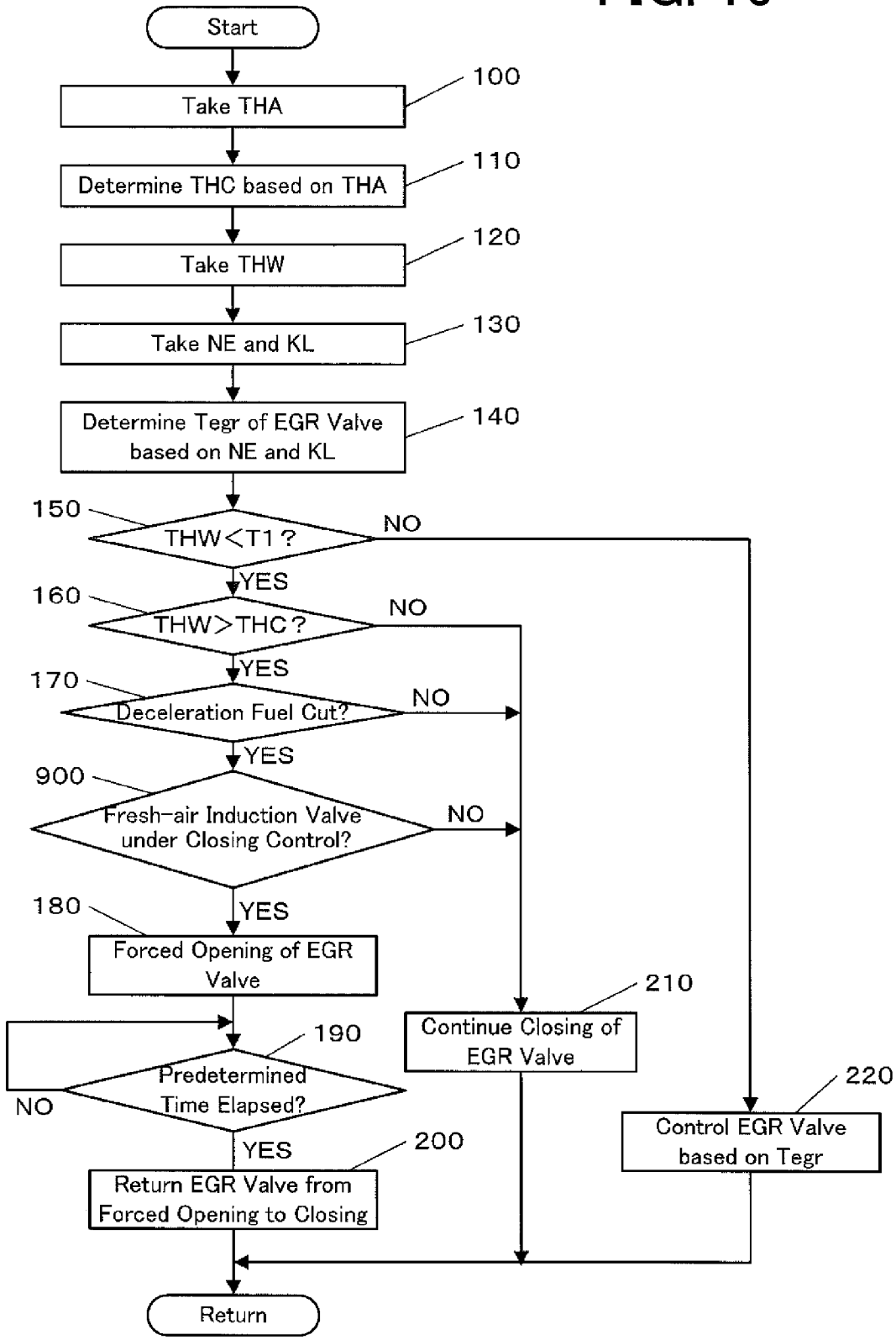
FIG. 15 is a flowchart showing one example of processing details of condensed water discharge control in a tenth embodiment.
Figure 16:
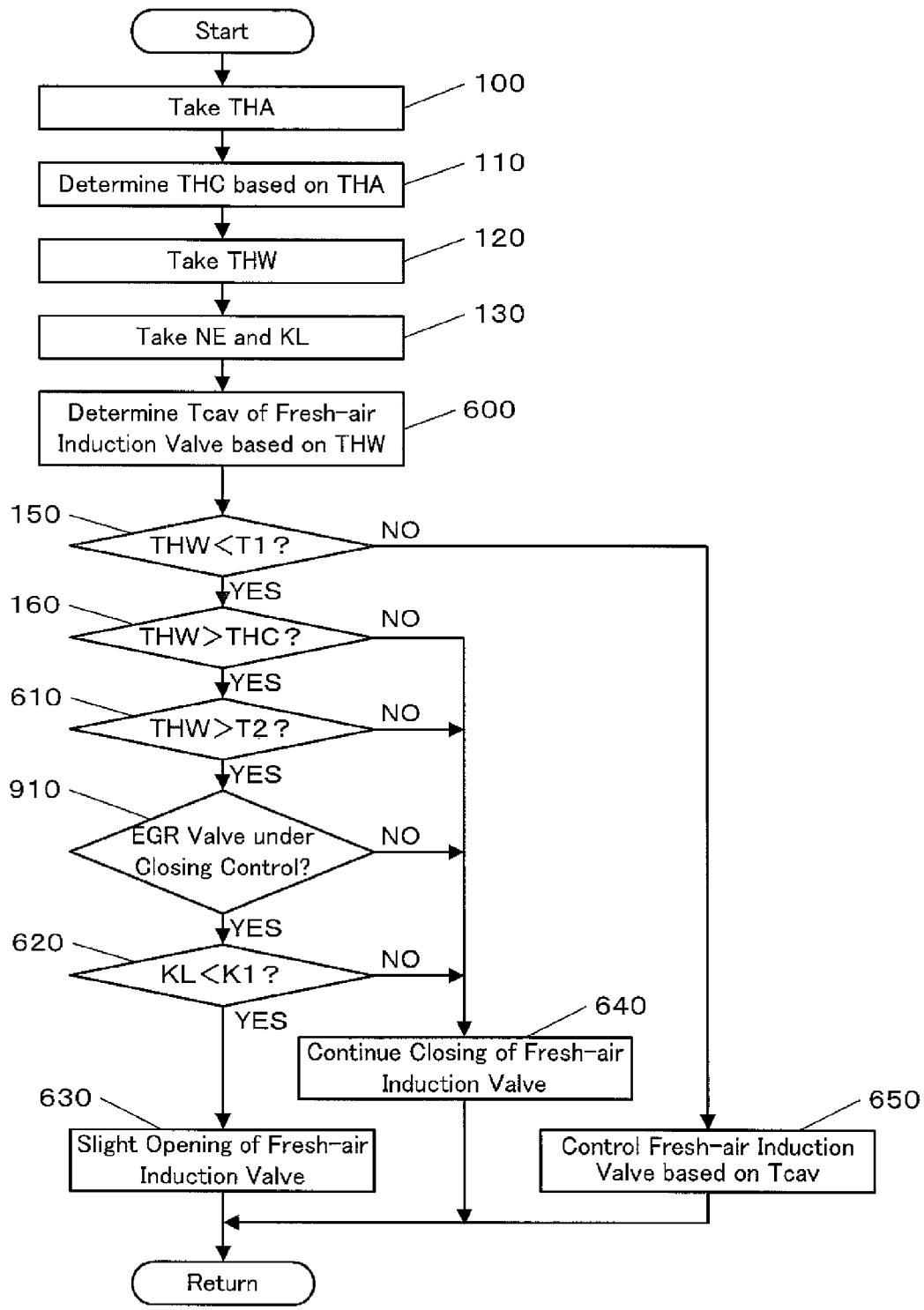
FIG. 16 is a flowchart showing one example of processing details of the condensed water discharge control in the tenth embodiment.

The present embodiment differs in the processing details of condensed water discharge control from the ninth embodiment. FIG. 15 is a flowchart showing one example of the processing details of the condensed water discharge control of the EGR valve 18 in the tenth embodiment. FIG. 16 is a flowchart showing one example of the processing details of the condensed water discharge control of the fresh-air induction valve 42 in the tenth embodiment. The flowchart of FIG. 15 differs from the flowchart of FIG. 3 in a processing of Step 900 provided between Steps 170 and 180 in the flowchart of FIG. 3. The flowchart of FIG. 16 differs from the flowchart of FIG. 14 in a processing of Step 910 provided between Steps 610 and 620 in the flowchart of FIG. 14.

In the routine of FIG. 15, after the processings of Steps 100 to 170 are executed, the ECU 50 determines in Step 900 whether or not the fresh-air induction valve 42 is undergoing the closing control. If NO in Step 900, the ECU 50 shifts the processing to Step 210 to continue the closing control of the EGR valve 18. If YES in Step 900, the ECU 50 shifts the processing to Step 180 to subject the EGR valve 18 to the forcibly opening control. Then, the ECU 50 shifts the processing to Step 190.

In the routine of FIG. 16, on the other hand, after the processings of Steps 100 to 610 are executed, the ECU 50 determines, in Step 910 subsequent to Step 610, whether or not the EGR valve 18 is undergoing the closing control. If NO in Step 910, the ECU 50 shifts the processing to Step 640 to continue the closing control of the fresh-air induction valve 42. If YES in Step 910, the ECU 50 shifts the processing to Step 620 and then executes the processings of Steps 620 and 630. Specifically, when the engine load KL is a predetermined light load, the fresh-air induction valve 42 is slightly opened.

According to the above control, the ECU 50 executes the forced opening control of the EGR valve 18 and the slight opening control of the fresh-air induction valve 42 at different timings in addition to the aforementioned control in the ninth embodiment.

Herein, the ECU 50 conducts the forced opening control of the EGR valve 18 during low-temperature light-load of the engine 1 to discharge the accumulating EGR gas to the exhaust passage 5. At that time, the thus opened EGR valve 18 allows a light amount of EGR gas to flow in the intake passage 3. This tends to deteriorate burning of the air-fuel mixture in the combustion chamber 16. Furthermore, the fresh-air induction valve 42 is controlled to slightly open during the low-temperature light-load of the engine 1, the accumulating EGR gas is allowed to be discharged into the intake passage 3. At that time, the EGR gas flows in atomized form into the intake passage 3 through the slightly opened fresh-air induction valve 42. This may deteriorate burning of the air-fuel mixture in the combustion chamber 16. In the present embodiment, therefore, the timing of discharging the accumulating EGR gas from the EGR passage 17 and the timing of discharging the accumulating EGR gas from the fresh-air induction passage 41 are alternately displaced to minimize deterioration in burning of the air-fuel mixture in the combustion chamber 16.

The exhaust gas recirculation apparatus of an engine with a supercharger in the present embodiment explained above can provide the following operations and effects in addition to those in the ninth embodiment. Specifically, in the tenth embodiment, when the EGR valve 18 is forcibly opened, the EGR gas may flow in slight amount into the intake passage 3 and be sucked into the combustion chamber 16. When the fresh-air induction valve 42 is slightly opened, furthermore, the condensed water in atomized form flows in slight amount into the intake passage 3 and is sucked into the combustion chamber 16. In the present embodiment, therefore, the forced opening control of the EGR valve 18 and the slight opening control of the fresh-air induction valve 42 are executed by the ECU 50 at different timings, so that the EGR gas and the condensed water are not simultaneously sucked in the combustion chamber 16. This can suppress deterioration in burning of the air-fuel mixture in the combustion chamber 16 during operation of the engine 1.

The present invention is not limited to each of the aforementioned embodiments and may be embodied in other specific forms without departing from the essential characteristics thereof.

In the above embodiments, the EGR valve 18 is configured as the poppet valve and the motor-operated valve. As an alternative, the EGR valve may be configured as a butterfly valve and a motor-operated valve.

The seventh and eighth embodiments explain the condensed water discharge control of the EGR valve 18. As an alternative, the same control may be executed for the condensed water discharge control of the fresh-air induction valve. In this case, the slight opening control of the fresh-air induction valve is performed instead of the forced opening control of the EGR valve 18.

INDUSTRIAL APPLICABILITY

The present invention is utilizable to for example an engine for a car irrespective of a gasoline engine or a diesel engine.

| Reference Signs List | | | |
|---|---|---|---|
| 1 | Engine | 3 | Intake passage |
| 3a | Surge tank | 5 | Exhaust passage |
| 7 | Supercharger | 8 | Compressor |
| 9 | Turbine | 10 | Rotary shaft |
| 16 | Combustion chamber | 17 | EGR passage |
| 17a | Outlet | 17b | Inlet |
| 18 | EGR valve | 41 | Fresh-air passage |
| 42 | Fresh-air induction valve | 50 | ECU |
| 51 | Intake pressure sensor | 52 | Rotation speed sensor |
| 53 | Water temperature sensor | 54 | Air flowmeter |
| 56 | Intake temperature sensor | 57 | Ignition switch |

The invention claimed is:

1. An exhaust gas recirculation apparatus of an engine with a supercharger, the engine including:

the supercharger provided between an intake passage and an exhaust passage of the engine and configured to increase intake pressure in the intake passage, the supercharger including a compressor placed in the intake passage, a turbine placed in the exhaust passage, and a rotary shaft connecting the compressor and the turbine so that the compressor and the turbine are integrally rotatable;

an exhaust recirculation passage configured to flow part of exhaust gas discharged from a combustion chamber of the engine to the exhaust passage to flow as exhaust recirculation gas to the intake passage to return to the combustion chamber, the exhaust recirculation passage having an inlet connected to the exhaust passage downstream of the turbine and an outlet connected to the intake passage upstream of the compressor;

an exhaust recirculation valve configured to regulate a flow of the exhaust recirculation gas in the exhaust recirculation passage;

an operating condition detection unit configured to detect an operating condition of the engine; and a control unit configured to control at least the exhaust recirculation valve based on the detected operating condition, the control unit being arranged to control the exhaust recirculation valve to fully close when the detected operating condition is a predetermined operating condition, wherein the outlet of the exhaust recirculation passage is located at a higher position than the inlet in a vertical direction to allow condensed water to flow downward from a downstream side to an upstream side of the exhaust recirculation valve and to allow the condensed water to flow downward through the exhaust recirculation passage to the exhaust passage, when the exhaust recirculation valve has to be controlled to fully close, the control unit subjects the exhaust recirculation valve to forced opening control when predetermined discharge conditions are established to discharge the condensed water from the downstream side of the exhaust recirculation valve, and the predetermined discharge conditions include before completion of warm-up of the engine and during deceleration fuel cutoff of the engine.

2. The exhaust gas recirculation apparatus of an engine with a supercharger according to claim 1, wherein the control unit returns the exhaust recirculation valve after a lapse of a predetermined time from start of the forced opening control.

3. The exhaust gas recirculation apparatus of an engine with a supercharger according to claim 1, wherein the predetermined discharge conditions further include after a lapse of a predetermined time from previous deceleration fuel cutoff.

4. The exhaust gas recirculation apparatus of an engine with a supercharger according to claim 3, wherein the control unit returns the exhaust recirculation valve after a lapse of a predetermined time from start of the forced opening control.

5. The exhaust gas recirculation apparatus of an engine with a supercharger according to claim 3, wherein the control unit subjects the exhaust recirculation valve to the forced opening control under condition that the engine is in a predetermined light load operation even when the condition of during the deceleration fuel cutoff which is one of the predetermined discharge conditions is not established.

6. The exhaust gas recirculation apparatus of an engine with a supercharger according to claim 5, wherein the control unit returns the exhaust recirculation valve after a lapse of a predetermined time from start of the forced opening control.

7. The exhaust gas recirculation apparatus of an engine with a supercharger according to claim 3, wherein the control unit is configured to calculate an estimated leakage amount of the exhaust recirculation gas leaking from the upstream side to the downstream side of the exhaust recirculation valve after the exhaust recirculation valve comes into a fully closed state, and forcibly open the exhaust recirculation valve under condition that the estimated leakage amount is larger than a predetermined value and the engine is in a predetermined light load operation even when the condition of during the deceleration fuel cutoff which is one of the predetermined discharge conditions is not established.

8. The exhaust gas recirculation apparatus of an engine with a supercharger according to claim 7, wherein the control unit returns the exhaust recirculation valve after a lapse of a predetermined time from start of the forced opening control.

9. An exhaust gas recirculation apparatus of an engine with a supercharger, the engine including:

the supercharger provided between an intake passage and an exhaust passage of the engine and configured to increase intake pressure in the intake passage, the supercharger including a compressor placed in the intake passage, a turbine placed in the exhaust passage, and a rotary shaft connecting the compressor and the turbine so that the compressor and the turbine are integrally rotatable;

an exhaust recirculation passage configured to flow part of exhaust gas discharged from a combustion chamber of the engine to the exhaust passage to flow as exhaust recirculation gas to the intake passage to return to the combustion chamber, the exhaust recirculation passage having an inlet connected to the exhaust passage downstream of the turbine and an outlet connected to the intake passage upstream of the compressor;

an exhaust recirculation valve configured to regulate a flow of the exhaust recirculation gas in the exhaust recirculation passage;

an operating condition detection unit configured to detect an operating condition of the engine; and a control unit configured to control at least the exhaust recirculation valve based on the detected operating condition, the control unit being arranged to control the exhaust recirculation valve to fully close when the detected operating condition is a predetermined operating condition, wherein the outlet of the exhaust recirculation passage is located at a higher position than the inlet in a vertical direction to allow condensed water to flow downward from a downstream side to an upstream side of the exhaust recirculation valve and to allow the condensed water to flow downward through the exhaust recirculation passage to the exhaust passage, and when the exhaust recirculation valve has to be controlled to fully close, the control unit subjects the exhaust recirculation valve to forced opening control when predetermined discharge conditions are established to discharge the condensed water from the downstream side of the exhaust recirculation valve, and wherein the predetermined discharge conditions include before completion of warm-up of the engine and during execution of stop of the engine, and the control unit returns the exhaust recirculation valve to closing control when a predetermined time elapses from start of the forced opening control.

10. An exhaust gas recirculation apparatus of an engine with a supercharger, the engine including:

the supercharger provided between an intake passage and an exhaust passage of the engine and configured to increase intake pressure in the intake passage, the supercharger including a compressor placed in the intake passage, a turbine placed in the exhaust passage, and a rotary shaft connecting the compressor and the turbine so that the compressor and the turbine are integrally rotatable;

an exhaust recirculation passage configured to flow part of exhaust gas discharged from a combustion chamber of the engine to the exhaust passage to flow as exhaust recirculation gas to the intake passage to return to the combustion chamber, the exhaust recirculation passage having an inlet connected to the exhaust passage downstream of the turbine and an outlet connected to the intake passage upstream of the compressor;

an exhaust recirculation valve configured to regulate a flow of the exhaust recirculation gas in the exhaust recirculation passage;

an operating condition detection unit configured to detect an operating condition of the engine; and a control unit configured to control at least the exhaust recirculation valve based on the detected operating condition, the control unit being arranged to control the exhaust recirculation valve to fully close when the detected operating condition is a predetermined operating condition, wherein the outlet of the exhaust recirculation passage is located at a higher position than the inlet in a vertical direction to allow condensed water to flow downward from a downstream side to an upstream side of the exhaust recirculation valve and to allow the condensed water to flow downward through the exhaust recirculation passage to the exhaust passage, when the exhaust recirculation valve has to be controlled to fully close, the control unit subjects the exhaust recirculation valve to forced opening control when predetermined discharge conditions are established to discharge the condensed water from the downstream side of the exhaust recirculation valve, and the predetermined discharge conditions include during starting of the engine and when the condensed water is in a non-freezable temperature state.

11. The exhaust gas recirculation apparatus of an engine with a supercharger according to claim 10, wherein the control unit returns the exhaust recirculation valve to closing control when a predetermined time elapses from start of the forced opening control.

12. The exhaust gas recirculation apparatus of an engine with a supercharger according to claim 10, wherein the control unit returns the exhaust recirculation valve to closing control when a rotation speed of the engine exceeds a predetermined value from start of the forced opening control.

13. An exhaust gas recirculation apparatus of an engine with a supercharger, the engine including:

the supercharger provided between an intake passage and an exhaust passage of the engine and configured to increase intake pressure in the intake passage, the supercharger including a compressor placed in the intake passage, a turbine placed in the exhaust passage, and a rotary shaft connecting the compressor and the turbine so that the compressor and the turbine are integrally rotatable;

an exhaust recirculation passage configured to flow part of exhaust gas discharged from a combustion chamber of the engine to the exhaust passage to flow as exhaust recirculation gas to the intake passage to return to the combustion chamber, the exhaust recirculation passage having an inlet connected to the exhaust passage downstream of the turbine and an outlet connected to the intake passage upstream of the compressor;

an exhaust recirculation valve configured to regulate a flow of the exhaust recirculation gas in the exhaust recirculation passage;

an operating condition detection unit configured to detect an operating condition of the engine; and a control unit configured to control at least the exhaust recirculation valve based on the detected operating condition, the control unit being arranged to control the exhaust recirculation valve to fully close when the detected operating condition is a predetermined operating condition, wherein the outlet of the exhaust recirculation passage is located at a higher position than the inlet in a vertical direction to allow condensed water to flow downward from a downstream side to an upstream side of the exhaust recirculation valve and to allow the condensed water to flow downward through the exhaust recirculation passage to the exhaust passage, and when the exhaust recirculation valve has to be controlled to fully close, the control unit subjects the exhaust recirculation valve to forced opening control when predetermined discharge conditions are established to discharge the condensed water from the downstream side of the exhaust recirculation valve, and wherein the engine is further provided with an intake regulating valve in the intake passage, a fresh-air induction passage to induce fresh air to the intake passage downstream of the intake regulating valve and a fresh-air induction valve to regulate a flow of fresh air in the fresh-air induction passage, and the control unit subjects the fresh-air induction valve to slight opening control from a closed state under condition of before warm-up of the engine and when the engine is in a light load operation.

14. The exhaust gas recirculation apparatus of an engine with a supercharger according to claim 13, wherein the control unit executes the forced opening control of the exhaust recirculation valve and the slight opening control of the fresh-air induction valve at different timings.

15. An exhaust gas recirculation apparatus of an engine with a supercharger, the engine including:

the supercharger provided between an intake passage and an exhaust passage of the engine and configured to increase intake pressure in the intake passage, the supercharger including a compressor placed in the intake passage, a turbine placed in the exhaust passage, and a rotary shaft connecting the compressor and the turbine so that the compressor and the turbine are integrally rotatable;

an exhaust recirculation passage configured to flow part of exhaust gas discharged from a combustion chamber of the engine to the exhaust passage to flow as exhaust recirculation gas to the intake passage to return to the combustion chamber, the exhaust recirculation passage having an inlet connected to the exhaust passage downstream of the turbine and an outlet connected to the intake passage upstream of the compressor;

an exhaust recirculation valve configured to regulate a flow of the exhaust recirculation gas in the exhaust recirculation passage;

an operating condition detection unit configured to detect an operating condition of the engine; and a control unit configured to control at least the exhaust recirculation valve based on the detected operating condition, the control unit being arranged to control the exhaust recirculation valve to fully close when the detected operating condition is a predetermined operating condition, wherein the outlet of the exhaust recirculation passage is located at a higher position than the inlet in a vertical direction to allow condensed water to flow downward from a downstream side to an upstream side of the exhaust recirculation valve and to allow the condensed water to flow downward through the exhaust recirculation passage to the exhaust passage, and when the exhaust recirculation valve has to be controlled to fully close, the control unit subjects the exhaust recirculation valve to forced opening control when predetermined discharge condition is established to discharge the condensed water from the downstream side of the exhaust recirculation valve, wherein the predetermined discharge condition includes during execution of stop of the engine, and the control unit returns the exhaust recirculation valve to closing control when starting of the engine is requested, and wherein the engine is further provided with an intake regulating valve in the intake passage, a fresh-air induction passage to induce fresh air to the intake passage downstream of the intake regulating valve and a fresh-air induction valve to regulate a flow of fresh air in the fresh-air induction passage, and the control unit subjects the fresh-air induction valve to slight opening control from a closed state under condition of before warm-up of the engine and when the engine is in a light load operation.

* * * * *